United States Patent
Toko et al.

(10) Patent No.: US 11,252,739 B2
(45) Date of Patent: Feb. 15, 2022

(54) MANAGEMENT DEVICE, TERMINAL DEVICE, AND NON-TRANSITORY COMPUTER-READABLE RECORDING MEDIUM

(71) Applicant: JVCKENWOOD Corporation, Yokohama (JP)

(72) Inventors: Masae Toko, Yokohama (JP); Ichiro Shishido, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 16/813,790

(22) Filed: Mar. 10, 2020

(65) Prior Publication Data
US 2020/0314870 A1     Oct. 1, 2020

(30) Foreign Application Priority Data
Mar. 25, 2019 (JP) .............................. JP2019-056373

(51) Int. Cl.
| | |
|---|---|
| H04W 72/12 | (2009.01) |
| H04W 16/04 | (2009.01) |
| H04W 88/18 | (2009.01) |
| H04W 24/08 | (2009.01) |
| H04W 16/18 | (2009.01) |
| H04W 4/08 | (2009.01) |
| H04W 88/04 | (2009.01) |

(52) U.S. Cl.
CPC ........... *H04W 72/121* (2013.01); *H04W 4/08* (2013.01); *H04W 16/04* (2013.01); *H04W 16/18* (2013.01); *H04W 24/08* (2013.01); *H04W 88/04* (2013.01); *H04W 88/184* (2013.01)

(58) Field of Classification Search
None
See application file for complete search history.

(56) References Cited

U.S. PATENT DOCUMENTS

2017/0034341 A1* 2/2017 Nagahama .............. H04L 67/22
2017/0280376 A1* 9/2017 Nagahama ............ H04W 48/06

FOREIGN PATENT DOCUMENTS

JP     2003-179669     6/2003

* cited by examiner

*Primary Examiner* — Peter Chen
*Assistant Examiner* — Jeff Banthrongsack
(74) *Attorney, Agent, or Firm* — Amin, Turocy & Watson, LLP

(57) ABSTRACT

A management device managing terminal devices includes a memory, a receiver, a controller, and a transmitter. The memory stores: area management information in which area specifying information specifying an area where the terminal device is positioned and area kind information indicating characteristic of the area are associated with each other; and memory management information in which the area kind information and memory setting information on memory regions for respective functions used by the terminal device are associated with each other. The receiver receives a request message including the area specifying information of one of the terminal devices. The controller specifies the area kind information corresponding to the one terminal device based on the request message and acquires the memory setting information corresponding to the specified area kind information from the memory. The transmitter transmits the acquired memory setting information to the one terminal device.

12 Claims, 18 Drawing Sheets

FIG.3

| GROUP ID | GROUP KIND |
|---|---|
| G1 | CIVILIAN |
| G2 | POLICE |
| G3 | POLICE |
| G4 | CIVILIAN |
| G5 | OTHER |
| ⋮ | ⋮ |

FIG.4

| BASE STATION ID | AREA KIND |
|---|---|
| B1 | URBAN |
| B2 | RURAL |
| B3 | URBAN |
| B4 | RURAL |
| B5 | OTHER |
| ⋮ | ⋮ |

FIG.5

| AREA KIND | GROUP KIND | MEMORY MANAGEMENT TABLE ID |
|---|---|---|
| OTHER | OTHER | STANDARD |
| URBAN | POLICE | MANAGEMENT TABLE #1 |
| RURAL | POLICE | MANAGEMENT TABLE #2 |
| URBAN | CIVILIAN | MANAGEMENT TABLE #3 |
| RURAL | CIVILIAN | MANAGEMENT TABLE #4 |
| ⋮ | ⋮ | ⋮ |

| AREA KIND | MEMORY MANAGEMENT TABLE ID |
|---|---|
| OTHER | MANAGEMENT TABLE #A |
| URBAN | MANAGEMENT TABLE #B |
| RURAL | MANAGEMENT TABLE #C |
| ⋮ | ⋮ |

| FUNCTION | USE FLAG | START ADDRESS | SIZE (VOLUME) |
|---|---|---|---|
| EMERGENCY TRANSMISSION FUNCTION | YES | A | Z |
| STATUS FUNCTION | YES | A+Z | Z |
| SMS FUNCTION | YES | A+2Z | Z |
| IMAGE FUNCTION | YES | A+3Z | Z |
| GAME FUNCTION | YES | A+4Z | Z |
| GPS FUNCTION | YES | A+5Z | Z |
| FREE REGION | YES | A+6Z | Z |

FIG.7B
300B

| FUNCTION | USE FLAG | START ADDRESS | SIZE (VOLUME) |
|---|---|---|---|
| EMERGENCY TRANSMISSION FUNCTION | YES | A | 2Z |
| STATUS FUNCTION | YES | A+2Z | Z |
| SMS FUNCTION | NO | 0 | 0 |
| IMAGE FUNCTION | YES | A+3Z | 3Z |
| GAME FUNCTION | NO | 0 | 0 |
| GPS FUNCTION | YES | A+6Z | Z |
| FREE REGION | NO | 0 | 0 |

FIG.7C
300C

| FUNCTION | USE FLAG | START ADDRESS | SIZE (VOLUME) |
|---|---|---|---|
| EMERGENCY TRANSMISSION FUNCTION | YES | A | Z |
| STATUS FUNCTION | YES | A+Z | Z |
| SMS FUNCTION | NO | 0 | 0 |
| IMAGE FUNCTION | YES | A+2Z | Z |
| GAME FUNCTION | NO | 0 | 0 |
| GPS FUNCTION | YES | A+3Z | Z |
| FREE REGION | YES | A+4Z | 3Z |

FIG.7D
300D

| FUNCTION | USE FLAG | START ADDRESS | SIZE (VOLUME) |
|---|---|---|---|
| EMERGENCY TRANSMISSION FUNCTION | YES | 0 | 0 |
| STATUS FUNCTION | NO | 0 | 0 |
| SMS FUNCTION | YES | A | Z |
| IMAGE FUNCTION | YES | A+Z | Z |
| GAME FUNCTION | YES | A+2Z | Z |
| GPS FUNCTION | YES | 0 | 0 |
| FREE REGION | YES | A+3Z | 4Z |

| FUNCTION | USE FLAG | START ADDRESS | SIZE (VOLUME) |
|---|---|---|---|
| EMERGENCY TRANSMISSION FUNCTION | YES | 0 | 0 |
| STATUS FUNCTION | NO | 0 | 0 |
| SMS FUNCTION | YES | A | Z |
| IMAGE FUNCTION | YES | A+Z | 2Z |
| GAME FUNCTION | YES | A+3Z | 2Z |
| GPS FUNCTION | YES | 0 | 0 |
| FREE REGION | YES | A+5Z | 2Z |

| RANGE OF AREA | AREA KIND |
|---|---|
| (LATITUDE1, ALTITUDE1) TO (LATITUDE2, ALTITUDE2) | URBAN |
| (LATITUDE3, ALTITUDE3) TO (LATITUDE4, ALTITUDE4) | RURAL |
| (LATITUDE5, ALTITUDE5) TO (LATITUDE6, ALTITUDE6) | URBAN |
| (LATITUDE7, ALTITUDE7) TO (LATITUDE8, ALTITUDE8) | RURAL |
| (LATITUDE9, ALTITUDE9) TO (LATITUDE10, ALTITUDE10) | OTHER |
| ⋮ | ⋮ |

400

| NUMBER OF USERS | UPDATE INFORMATION ID |
|---|---|
| x1 | UPDATE INFORMATION #1 |
| x2 | UPDATE INFORMATION #2 |
| x3 | UPDATE INFORMATION #3 |
| ⋮ | ⋮ |

MANAGEMENT DEVICE, TERMINAL DEVICE, AND NON-TRANSITORY COMPUTER-READABLE RECORDING MEDIUM

CROSS-REFERENCE TO RELATED APPLICATIONS

This application claims priority from Japanese Application No. 2019-056373, filed on Mar. 25, 2019, the contents of which are incorporated by reference herein in its entirety.

BACKGROUND

The present disclosure relates to a management device, a terminal device, and a non-transitory computer-readable recording medium.

In a known technique of a communication terminal device, a memory region of the communication device is controlled based on a usage of a user.

For example, JP-A-2003-179669 discloses a mobile terminal device in which a memory region for a function that is used less frequently is allocated as a memory region for a function that is desired by the user.

However, the management of memory regions in a plurality of terminals is not considered in JP-A-2003-179669. For example, the more needed function and the less needed function may vary depending on the area where the terminal device is used. In this case, in the conventional technique, the setting of memory regions needs to be changed for each terminal. Moreover, when a wireless machine for the business use is used as the terminal device, the necessary function may be different for each group. In this case, in the conventional technique, the memory regions in the terminals that belong to a particular group cannot be set.

SUMMARY

A management device according to an embodiment is for managing a plurality of terminal devices. The management device includes a memory, a receiver, a controller, and a transmitter. The memory configured to store therein: area management information in which area specifying information that specifies an area where the terminal device is positioned and area kind information that indicates a characteristic of the area are associated with each other; and memory management information in which the area kind information and memory setting information on memory regions for respective functions to be used by the terminal device are associated with each other. The receiver is configured to receive a request message including the area specifying information of one of the terminal devices. The controller is configured to specify the area kind information corresponding to the one terminal device based on the request message and acquire the memory setting information corresponding to the specified area kind information from the memory. The transmitter is configured to transmit the memory setting information acquired by the control unit to the one terminal device.

A terminal device according to an embodiment includes a receiver and a controller. The receiver is configured to receive, from a management device, memory setting information which is memory management information determined in accordance with a position where the terminal device is positioned. The memory setting information includes: information on functions to be used by the terminal device; and information on memory size available for each of the functions. The controller is configured to set memory regions used for the respective functions in the memory based on the memory setting information.

A non-transitory computer-readable recording medium according to an embodiment contains a computer program. The computer program causes a computer to execute: storing area management information in which area specifying information that specifies an area where a terminal device is positioned and area kind information that indicates a characteristic of the area are associated with each other; storing memory management information in which the area kind information and memory setting information on memory regions for respective functions to be used by the terminal device are associated with each other; receiving a request message including the area specifying information of one of the terminal devices; specifying the area kind information corresponding to the one terminal device in the area management information based on the request message; acquiring the memory setting information corresponding to the specified area kind information from the memory; and transmitting the acquired memory setting information to the one terminal device.

BRIEF DESCRIPTION OF THE DRAWINGS

FIG. 3 is a diagram for describing an example of data structure of group management information;

FIG. 4 is a diagram for describing an example of data structure of area management information;

FIG. 5 is a diagram for describing an example of data structure of memory management information;

FIG. 6 is a diagram for describing another example of a data structure of memory management information;

FIGS. 7A to 7E are diagrams for describing examples of memory management tables;

DETAILED DESCRIPTION

Embodiments of the present invention are hereinafter described in detail with reference to the attached drawings. The present invention is not limited by these embodiments and if there is a plurality of embodiments, the embodiments may be combined with each other.

First Embodiment

Figure 1:
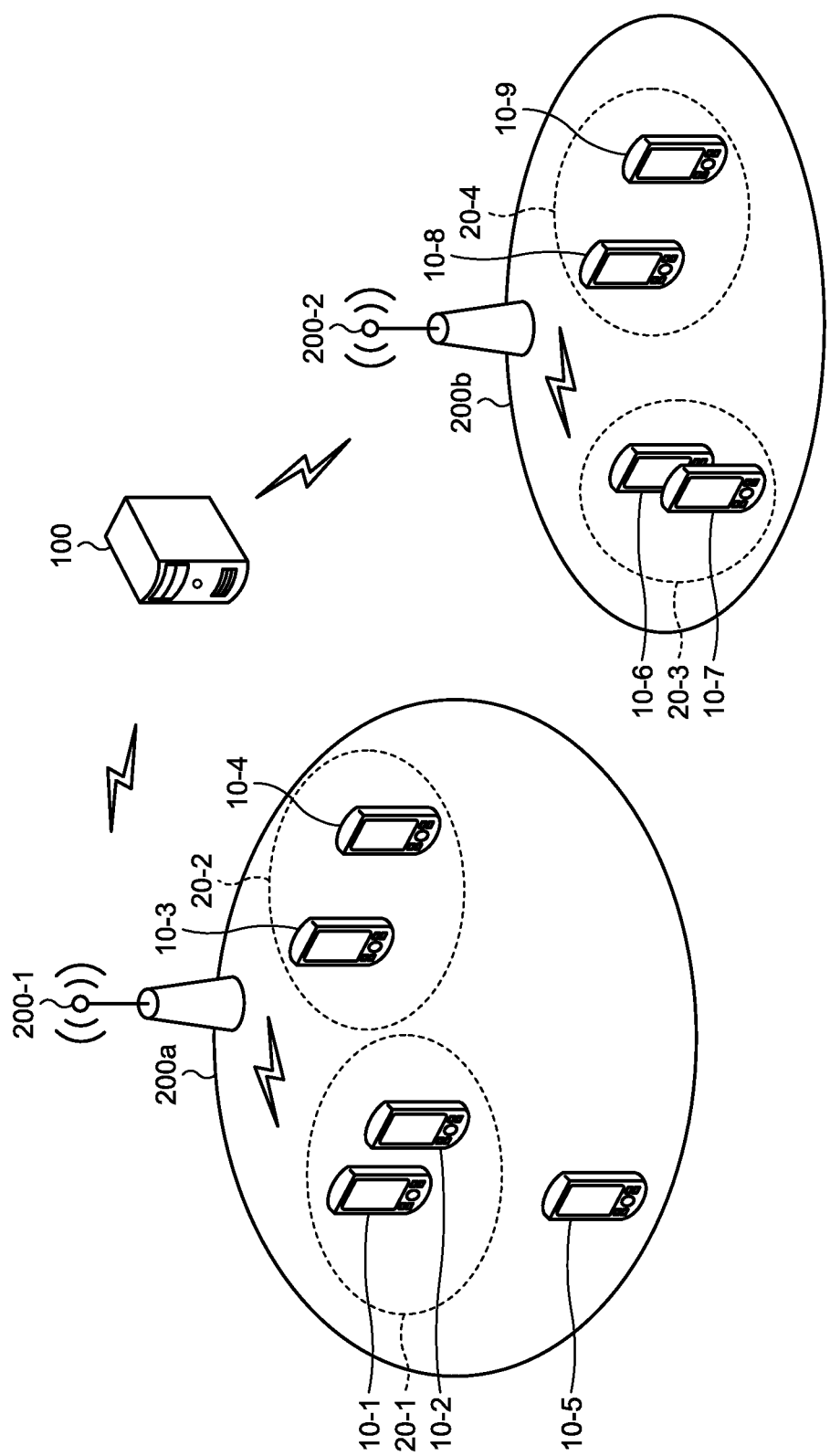
FIG. 1 is a diagram illustrating one example of a structure of a wireless communication system according to a first embodiment of the present invention.

With reference to FIG. 1, a wireless communication system according to a first embodiment of the present invention is described. FIG. 1 is a schematic diagram illustrating one example of a structure of the wireless communication system according to the first embodiment of the present invention.

The wireless communication system 1 includes a first terminal device 10-1, a second terminal device 10-2, a third terminal device 10-3, a fourth terminal device 10-4, a fifth terminal device 10-5, a sixth terminal device 10-6, a seventh terminal device 10-7, an eighth terminal device 10-8, a ninth terminal device 10-9, a management device 100, a first base station 200-1, and a second base station 200-2. In the example illustrated in FIG. 1, the wireless communication system 1 includes the two base stations and the nine terminal devices; however, the number of base stations and the number of terminal devices are not limited to these numbers. The first base station 200-1 and the second base station 200-2 are also referred to as the base station 200 collectively if these stations do not need to be distinguished. The first terminal device 10-1 to the ninth terminal device 10-9 are also referred to as the terminal device 10 collectively if these terminal devices do not need to be distinguished.

The management device 100 is a computer such as a server computer. The management device 100 is connected to the first base station 200-1 and the second base station 200-2 with a wired or wireless network.

A first communication area 200a is a communication area of the first base station 200-1. To the communication area, an area kind is assigned. The area kind of the first communication area 200a is, for example, a rural area. The area kind refers to a concept indicating the kind (type) of the communication area (region), in other words, information indicating the characteristic (property) of the communication area. The area kind is also referred to as area kind information. One communication area (one base station 200) corresponds to one area kind, and one area kind corresponds to one or more communication areas (one or more base stations 200). That is to say, a plurality of communication areas may correspond to one area kind. In the first communication area 200a, the first terminal device 10-1 to the fifth terminal device 10-5 are positioned. In this case, the first base station 200-1 communicates with the first terminal device 10-1 to the fifth terminal device 10-5. In the first communication area 200a, each terminal device is operated in any one of plural groups. The first terminal device 10-1 and the second terminal device 10-2 belong to a first group 20-1. The third terminal device 10-3 and the fourth terminal device 10-4 belong to a second group 20-2. The fifth terminal device 10-5 does not belong to any group. The first group 20-1 is a public organization, for example, a police group formed by police. The second group 20-2 is a civilian group formed by civilians. The group kind is a concept expressing the kind (type) of group, in other words, information indicating the characteristic (property) of the group. The groups that are different in property, for example "police group" and "civilian group", are classified into different group kinds. The group kind is also referred to as group kind information. One group corresponds to one group kind, and one group kind corresponds to one or more groups. That is to say, a plurality of groups may correspond to one group kind. In FIG. 1, in the first communication area 200a, the terminal devices belonging to the groups corresponding to two group kinds, "police" and "civilian", are operated.

A second communication area 200b is a communication area of the second base station 200-2. The area kind of the second communication area 200b is, for example, an urban area. The second communication area 200b is, for example, an urban area. In the second communication area 200b, the sixth terminal device 10-6 to the ninth terminal device 10-9 are positioned. In this case, the second base station 200-2 communicates with the sixth terminal device 10-6 to the ninth terminal device 10-9. In the second communication area 200b, the sixth terminal device 10-6 and the seventh terminal device 10-7 belong to a third group 20-3. The eighth terminal device 10-8 and the ninth terminal device 10-9 belong to a fourth group 20-4. The third group 20-3 is a public organization, for example, a police group formed by police. The fourth group 20-4 is a civilian group formed by civilians. That is to say, in the second communication area 200b, the terminal devices in the groups corresponding to two group kinds, "police" and "civilian", are operated.

The management device 100 sets a memory region of a memory of each terminal device based on the area kind and the group kind. The memory region is also referred to as a storage region. Although the rural area and the urban area are described as the examples of the area kind and the police and the civilian are described as the examples of the group kind, these are mere examples and do not limit the present invention. In addition, the terminal device 10 that belongs to one group may be registered in the plural base stations 200. The number of terminal devices 10 registered in one base station 200 is not limited to that illustrated in FIG. 1. For example, one terminal device 10 belonging to a certain group may be registered in a certain base station 200 and the terminal device 10 belonging to the same group may be registered in another base station 200.

Management Device

Figure 2:
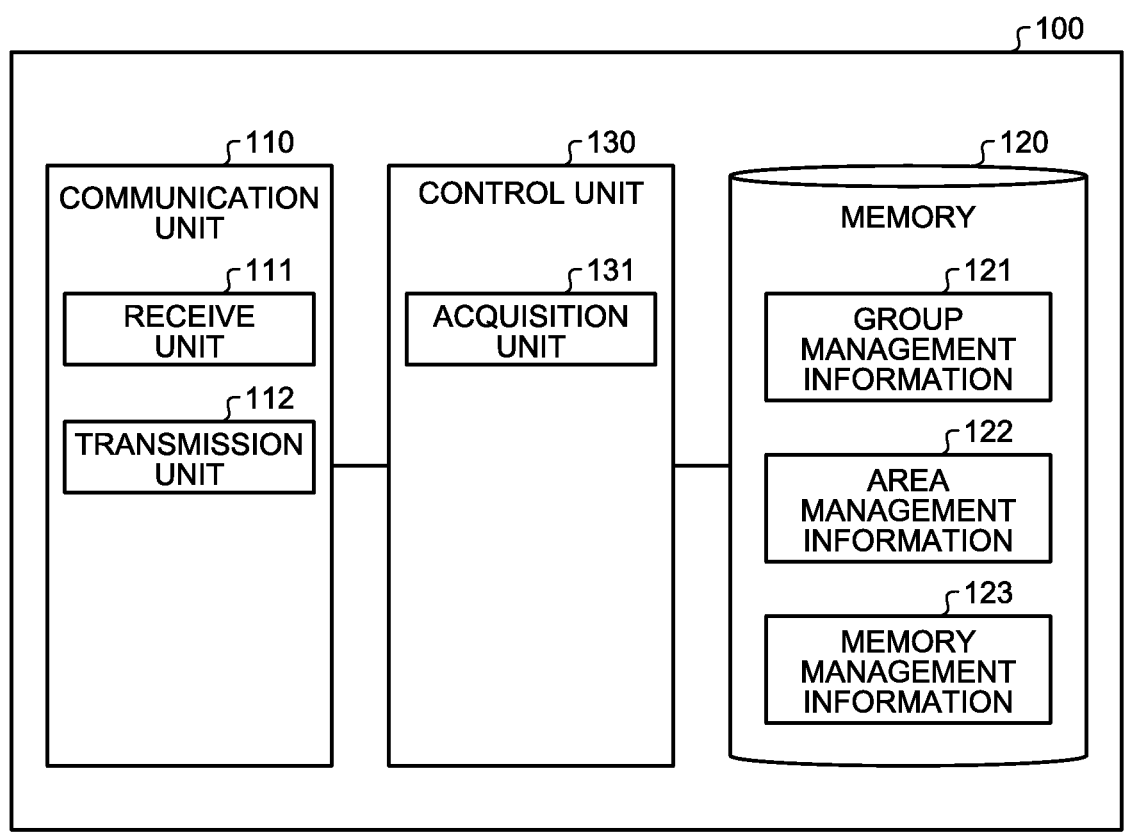
FIG. 2 is a block diagram illustrating one example of a structure of a management device according to the first embodiment of the present invention.

With reference to FIG. 2, a structure of the management device 100 according to the first embodiment is described.

FIG. 2 is a block diagram illustrating one example of the structure of the management device 100 according to the first embodiment.

The management device 100 includes a communication unit 110, a memory 120, and a control unit 130. The control unit 130 is also referred to as a controller.

The communication unit 110 communicates with an external device through a wireless or wired network. The communication unit 110 includes a receive unit 111 and a transmission unit 112. The receive unit 111 is also referred to as a receiver. The transmission unit 112 is also referred to as a transmitter. The communication unit 110 communicates with the base stations 200 in accordance with the control unit 130, for example. The communication unit 110 receives a memory information request message from the base stations 200 or transmits memory setting information to the base stations 200, for example.

The memory 120 stores therein various pieces of data. The memory 120 is formed by, for example, a hard disk drive (HDD), a solid state drive (SSD), or the like. The memory 120 may be formed by other semiconductor memory or the like. The memory 120 stores therein group management information 121, area management information 122, and memory management information 123. The memory 120 may store therein computer programs for controlling the management device 100.

The group management information 121 is data in which a group ID (group identifier) for identifying the group and the group kind are associated with each other. In the present embodiment, the terminal device 10 or the user who uses the terminal device 10 can belong to one or plural groups. However, the terminal device 10 that does not belong to any group may exist.

With reference to FIG. 3, the group management information 121 is described. FIG. 3 is a diagram illustrating an example of a data structure of the group management information 121.

As illustrated in FIG. 3, the group management information 121 is data in which the group ID and the group kind are associated with each other. In the example illustrated in FIG. 3, for example, the group ID "G1" is associated with the group kind "civilian". For example, the group ID "G2" is associated with the group kind "police". For example, the group ID "G5" is associated with the group kind "other". In the example illustrated in FIG. 3, there are three group kinds (group kind information): "civilian", "police", and "other"; however, the present invention is not limited to these kinds. The present invention may employ other group kinds than those illustrated in FIG. 3. In addition, the number of group kinds is not limited to this example either.

The area management information 122 is data in which information that specifies the area where the terminal device 10 is positioned (area specifying information) and the area kind are associated with each other. In the present embodiment, a base station ID for identifying the base station is used as the information that specifies the area where the terminal device 10 is positioned; however, the present invention is not limited to this example. The area kind (area kind information) is the information indicating the characteristic of the communication area (region) of the base station. The base station ID is also referred to as a base station identifier or base station identification information. Once the base station ID is known, it is clarified that the terminal device 10 registered in the corresponding base station 200 exists in the communication area thereof. That is to say, the approximate position of the terminal device 10 is specified by the base station ID. Therefore, the base station ID is regarded as the information that specifies the area where the terminal device 10 is positioned.

With reference to FIG. 4, the area management information 122 is described. FIG. 4 is a diagram for describing an example of a data structure of the area management information 122.

As illustrated in FIG. 4, the area management information 122 is data in which the base station ID and the area kind are associated with each other. In the example illustrated in FIG. 4, for example, the base station ID "B1" is associated with the area kind "urban". For example, the base station ID "B2" is associated with the area kind "rural". For example, the base station ID "B5" is associated with the area kind "other". In the example illustrated in FIG. 4, there are three area kinds: "urban", "rural", and "other"; however, the present invention is not limited to these kinds. In the area management information 122, the area kinds of the adjacent base stations may be the same. The area kinds of the base stations may be the same. The present invention may employ other area kinds than those illustrated in FIG. 4. Moreover, the area kinds "urban" and "rural" may be sectioned in more detail. In addition, the number of area kinds is not limited to a particular number either.

The memory management information 123 is data in which the area kind, the group kind, and a memory management table ID (management table ID) are associated with each other. The memory management table ID is an identifier (ID) for identifying the memory management table. The memory management table is the information indicating the function that the terminal device 10 can use, and the memory region for each function. The information indicating the memory region includes the information on a start address and the size. The memory region of the memory of the terminal device 10 is set in accordance with the memory management table. The details of the memory management table are described below.

With reference to FIG. 5, the memory management information 123 is described. FIG. 5 is a diagram for describing an example of a data structure of the memory management information 123.

As illustrated in FIG. 5, the memory management information 123 is data in which the area kind, the group kind, and the memory management table ID are associated with each other. In the example illustrated in FIG. 5, the memory management table ID "standard" is associated with the area kind "other" and the group kind "other". This means that the terminal device 10 with the area kind "other" and the group kind "other" uses the memory management table "standard". For example, the memory management table ID "management table #1" is associated with the area kind "urban" and the group kind "police". For example, the memory management table ID "management table #4" is associated with the area kind "rural" and the group kind "civilian". The memory management table ID and the memory management table are associated with each other on a one-to-one basis; therefore, the memory management information 123 is data in which the area kind, the group kind, and the memory management table are associated with each other. The memory management table is also referred to as memory setting information. The memory management table includes information on the memory regions to be used by the terminal devices 10; therefore, the memory management information 123 also serves as the data for associating the area kind, the group kind, and the information on the memory region to be used by the terminal device 10, as described below.

In the example illustrated in FIG. 5, two kinds of information, the area kind and the group kind, are associated with each other in the memory management information 123; however, the memory management information may include one kind.

With reference to FIG. 6, memory management information 123A including only one kind (area kind) is described. FIG. 6 is a diagram for describing another example of a data structure of the memory management information 123A.

As illustrated in FIG. 6, the memory management information 123A is data in which the area kind and the memory management ID (management table ID) are associated with each other. In the example illustrated in FIG. 6, the area kind "other" is associated with the memory management table ID "management table #A". This means that, if the area kind is "other", the memory management table identified as the memory management table ID "management table #A" is used. For example, the area kind "urban" is associated with the memory management table ID "management table #B". For example, the area kind "rural" is associated with the memory management table ID "management table #C". In this manner, in the memory management information 123A, the memory management table that is used for the terminal device 10 is determined by only the area kind. Similarly, in the memory management information, the group kind and the memory management table ID may be associated with each other and the memory management table may be determined by only the group kind.

Memory Management Table

With reference to FIG. 7A, FIG. 7B, FIG. 7C, FIG. 7D, and FIG. 7E, some examples of the memory management tables are described. FIG. 7A to FIG. 7E are diagrams for describing examples of the memory management tables.

FIG. 7A illustrates a memory management table 300A with the memory management table ID "standard". The memory management table 300A is data in which the function, the use flag, the start address, and the size (volume) are associated with each other.

The function is the function performed by the terminal device 10. Examples of the function include "emergency transmission function", "status function", "SMS (Short Message Service) function", "image function", "game function", "GPS (Global Positioning System) function", and "free region". "Emergency transmission function" is the function for transmitting information informing of an emergency or urgency situation in which, for example, the user who uses the terminal device 10 falls down. In other words, "emergency transmission function" is for performing an emergency communication. "Status function" is the simple cryptographic communication function, with use of numbers that are determined in advance, for transmitting information informing of the status of the user who uses the terminal device 10. "SMS function" is the function about the communication using text (letters). "Image function" is the function about photographing. "Game function" is the function about the game played in the terminal device 10. "GPS function" is the function for acquiring the position information of the terminal. "Free region" is a memory region whose purpose is not limited.

If the corresponding function is used, "Yes" is set to the use flag and if the corresponding function is not used, "No" is set to the use flag. The start address indicates the start position of the memory region of the memory in which the data relating to the corresponding function is stored, and the size indicates the storage volume. For example, the size is indicated by the number of bytes of the storage volume. In this manner, the memory management table stores therein the functions to be used by the terminal devices 10 and the information on the memory regions for the respective functions.

In the memory management table 300A, the specification flag of each function is set to "Yes". The size for each function is indicated by "Z" bytes. In other words, each function can use the memory region with "Z" bytes. That is to say, in the standard state, the memory region with "Z" bytes is assigned to each of the seven functions ranging from "emergency transmission function" to "free region"; thus, the memory region with a total of "7Z" bytes is used.

Specifically, in the memory management table 300A, the data relating to "emergency transmission function" starts to be stored from the position of the address "A". In this case, the data relating to "status function" starts to be stored from the position of the address "A+Z" because the size for "emergency transmission function" is "Z".

A memory management table 300B illustrated in FIG. 7B is one example of the memory management table in the case where the area kind is "urban" and the group kind is "police". This management table corresponds to the memory management table ID "management table #1" in the example illustrated in FIG. 5.

As illustrated in the memory management table 300B, in the case where the group kind is "police", it is considered that "SMS function" and "game function" are less required, and thus the use flags of these functions are set to "No". The use flag of "free region" is also set to "No". The start address and the size for the function whose use flag is set to "No" are "0". In other words, the data relating to the function whose use flag is set to "No" is not stored in the memory of the terminal device 10. In the case where the area kind is "urban" and the group kind is "police", it is considered that "emergency transmission function" for transmitting information informing of the emergency situation and "image function" for saving the evidence photograph are more required. Therefore, the size for "emergency transmission function" is made twice as large as the standard size to be "2Z". In addition, the size for "image function" is made three times as large as the standard size to be "3Z".

Specifically, in the memory management table 300B, the data relating to "emergency transmission function" starts to be stored from the position of the address "A". In this case, the data relating to "status function" starts to be stored from the position of the address "A+2Z" because the size of "emergency transmission function" is "2Z". Here, the data relating to the SMS function is not stored in the memory of the terminal device 10. Therefore, the data relating to "image function" starts to be stored from the position of the address "A+3Z".

A memory management table 300C illustrated in FIG. 7C is one example of the memory management table in the case where the area kind is "rural" and the group kind is "police". This management table corresponds to the memory management table ID "management table #2" in the example illustrated in FIG. 5.

As illustrated in the memory management table 300C, in the case where the group kind is "police", it is considered that "SMS function" and "game function" are less required; therefore, the use flags for these functions are set to "No". It is considered that "emergency transmission function" and "image function" are not required as much as when the area kind is "urban" and the group kind is "police". Therefore, the sizes for "emergency transmission function" and "image function" are made standard and the surplus memory region is assigned to "free region". The volume of "free region" is three times as large as the standard volume, that is, "3Z".

A memory management table 300D illustrated in FIG. 7D is one example of the memory management table in the case where the area kind is "urban" and the group kind is "civilian". This management table corresponds to the memory management table ID "management table #3" in the example illustrated in FIG. 5.

As illustrated in the memory management table 300D, in the case where the group kind is "civilian", it is considered that "status function" that is the simple cryptographic communication is less required; therefore, the use flag for this functions is set to "No". The use flags for "emergency transmission function" and "GPS function" are set to "Yes"; however, the start address and the size thereof are "0". In this case, the dedicated memory region is not assigned to "emergency transmission function" or "GPS function". The data relating to "emergency transmission function" and "GPS function" is stored in "free region". In the memory management table 300D, the volume four times the standard volume, that is, "4Z" is assigned to "free region". Here, "emergency transmission function" and "GPS function" are the functions that are determined necessary; however, since it is difficult to predict how much memory size is necessary, "free region" is assigned. That is to say, if it is difficult to predict the ratio (degree) of the functions that are used in the terminal device 10, it is preferable to increase the volume of "free region" as illustrated in the memory management table 300D. The process of the memory management in the execution of the computer program can be simplified more when the dedicated memory region is assigned for each function. Thus, from the viewpoint of the executing speed, it is preferable to assign the dedicated memory region for each function.

A memory management table 300E illustrated in FIG. 7E is one example of the memory management table in the case where the area kind is "rural" and the group kind is "civilian". This management table corresponds to the memory management table ID "management table #4" in the example illustrated in FIG. 5.

As illustrated in the memory management table 300E, "emergency transmission function", "status function", and "GPS function" are similar to those in the memory management table 300D illustrated in FIG. 7D. As compared to the case in which the area kind is "urban", the volume of "image function" is increased from "Z" to "2Z" and the volume of "game function" is increased from "2Z" to "3Z". Moreover, the volume of "free region" is decreased from "4Z" to "2Z". The volume of "image function" is increased because it is assumed that there may be more opportunities to take photographs of rivers and mountains to prepare for the disaster control or photographs of farm products and a pasture than when the area kind is "urban", for example.

As illustrated in FIG. 7A to FIG. 7E, the function that is much required by the terminal device 10 is different depending on the area kind. Although the area kind is the same, the function that is much required is different depending on the group kind. Therefore, the arrangement of the memory regions in the memory is changed depending on the combination of the area kind and the group kind. By changing the arrangement of the memory regions in the memory of the terminal device 10 in accordance with the area kind and the group kind, the memory can be used effectively.

Back to FIG. 2, the control unit 130 controls each part of the management device 100. The control unit 130 is formed by, for example, a central processing unit (CPU), a random access memory (RAM), a read only memory (ROM), or the like. In this case, the ROM stores computer programs for the CPU to control each part. The CPU reads out the computer program stored in the ROM, secures the data region in the RAM, and executes the computer program, thereby controlling each part of the management device 100. The control unit 130 includes an acquisition unit 131.

The reception unit 111 included in the communication unit 110 receives various pieces of information from the base station 200. The reception unit 111 also receives various pieces of information from each terminal device 10 through the base station 200. The reception unit 111 receives a memory information request message (request message) from the base station 200. The memory information request message is for rearranging, by the terminal device 10 registered in the base station 200, the memory regions in the memory. The memory information request message includes the base station ID as the information that specifies the area where the terminal device 10 is positioned. The memory information request message also includes the group ID to which the terminal device 10 or the user who uses the terminal device 10 belongs. The information received by the reception unit 111 is notified to the control unit 130.

The acquisition unit 131 acquires various pieces of information based on the information received by the reception unit 111. With reference to the memory management information 123 in the memory 120, the acquisition unit 131 acquires the memory management table that each terminal device 10 should use based on the memory information request message received by the receive unit 111. The memory management table acquired here is the information that defines how to use the memory (memory) of the terminal device 10 that has received the memory information request message, and includes the function that the terminal device 10 should use and the information on the memory region for each function. The memory region in the memory of the terminal device 10 is set in accordance with the memory management table; therefore, the memory management table is also regarded as "memory setting information". The term "memory setting information" in the following description means a particular memory management table acquired in accordance with the memory information request message.

The transmission unit 112 included in the communication unit 110 transmits various pieces of information to the terminal device 10. The transmission unit 112 transmits various pieces of information to the terminal device 10 through the base station 200. The transmission unit 112 transmits the memory setting information to the terminal device 10. Specifically, the transmission unit 112 transmits the memory management table acquired by the acquisition unit 131 to the terminal device 10.

Process Performed by Wireless Communication System 1

Figure 8:
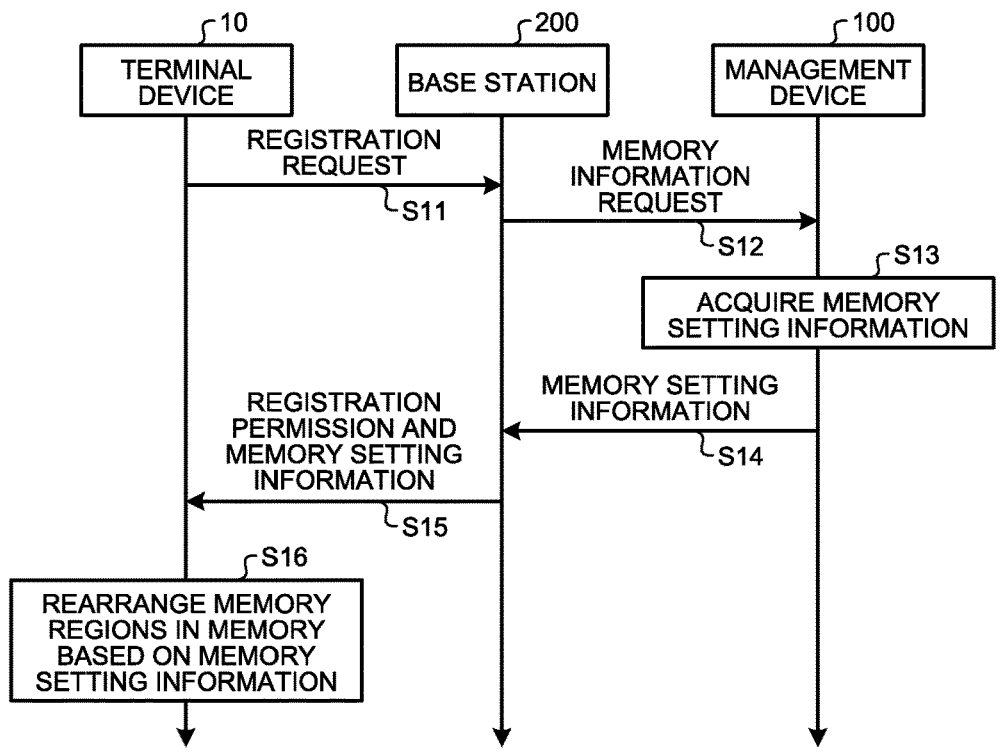
FIG. 8 is a sequence diagram illustrating the procedure of the transmission and reception of a message until a terminal device rearranges memory regions in a memory based on memory setting information.

With reference to FIG. 8, the procedure of the process performed by the wireless communication system 1 is described. FIG. 8 is a sequence diagram illustrating the procedure of the transmission and reception of the message until the terminal device rearranges the memory regions in the memory.

When registering the terminal device 10 in the base station 200 for performing a wireless communication, the terminal device 10 transmits a registration request (position registration request) including an identification ID (terminal ID) for identifying the terminal device 10 and the group ID to the base station 200 (step S11). The base station 200 transmits the memory information request message to the management device 100 (step S12). The memory information request message includes the base station ID and the group ID. The management device 100 acquires the memory setting information based on the memory information request message (step S13). The process in which the management device 100 acquires the memory setting information is described later. The management device 100 transmits the memory setting information to the base station 200 (step S14). The base station 200 transmits a registration permission and the memory setting information that is received from the management device 100 to the terminal device 10 (step S15). The terminal device 10 rearranges the memory regions in the memory based on the memory setting information, that is, the memory management table (step S16). At step S16, the terminal device 10 may delete the data stored in the memory when rearranging the memory regions in the memory.

Process in First Embodiment

Figure 9:
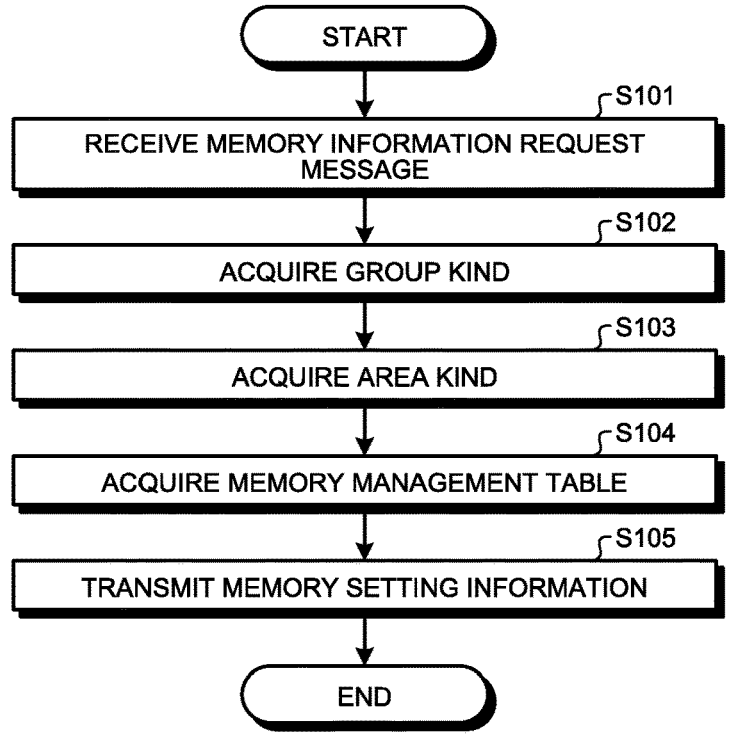
FIG. 9 is a flowchart illustrating one example of the procedure of a process in which a control unit of the management device according to the first embodiment of the present invention transmits memory setting information.

With reference to FIG. 9, the process performed by the control unit 130 in the management device 100 is described. FIG. 9 is a flowchart illustrating one example of the procedure of the process in which the control unit 130 in the management device 100 transmits the memory setting information.

The control unit 130 receives the memory information request message from the base station through the communication unit 110 (step S101). Then, the process advances to step S102.

The control unit 130 extracts the group ID from the memory information request message, and acquires the group kind corresponding to the extracted group ID with reference to the group management information 121 (step S102). Then, the process advances to step S103.

The control unit 130 extracts the base station ID from the memory information request message, and acquires the area kind corresponding to the extracted base station ID with reference to the area management information 122 (step S103). Then, the process advances to step S104.

The control unit 130 acquires the memory management table corresponding to the group kind acquired at step S102 and the area kind acquired at step S103 with reference to the memory management information 123 (step S104). For example, if the area kind is "rural" and the group kind is "police", the control unit 130 acquires "management table #2" as the memory management table ID as illustrated in FIG. 5. Since "management table #2" corresponds to the memory management table 300C illustrated in FIG. 7C, the control unit 130 acquires the data of the memory management table 300C. As described above, the memory management table acquired here is also referred to as the memory setting information. That is to say, at step S104, the control unit 130 acquires the memory setting information corresponding to the memory information request message. Then, the process advances to step S105.

The control unit 130 transmits the memory setting information acquired at step S104 to the base station 200 through the communication unit 110 (step S105). The base station 200 transmits the memory setting information to the terminal device 10. Thus, the process in FIG. 9 ends. That is to say, the management device 100 acquires the memory setting information that one terminal device (terminal device 10 that transmits the registration request) should use in accordance with the information (base station ID of the base station 200 to be used by the terminal device 10) that specifies the area where the one terminal device exists, and transmits the memory setting information to the one terminal device.

The control unit 130 may acquire only the area kind without acquiring the group kind. That is to say, the control unit 130 may skip the process of step S102. In this case, the control unit 130 may acquire the memory management table with reference to the memory management information 123A illustrated in FIG. 6 at step S104. The control unit 130 may acquire only the group kind without acquiring the area kind. In this case, the memory management information in which the group kind and the memory management table ID are associated with each other may be used instead of the memory management information 123A. That is to say, the control unit 130 may acquire the memory setting information (memory management table) that the terminal device 10 should use, by using at least one of the area kind and the group kind.

Structure of Terminal Device

Figure 10:
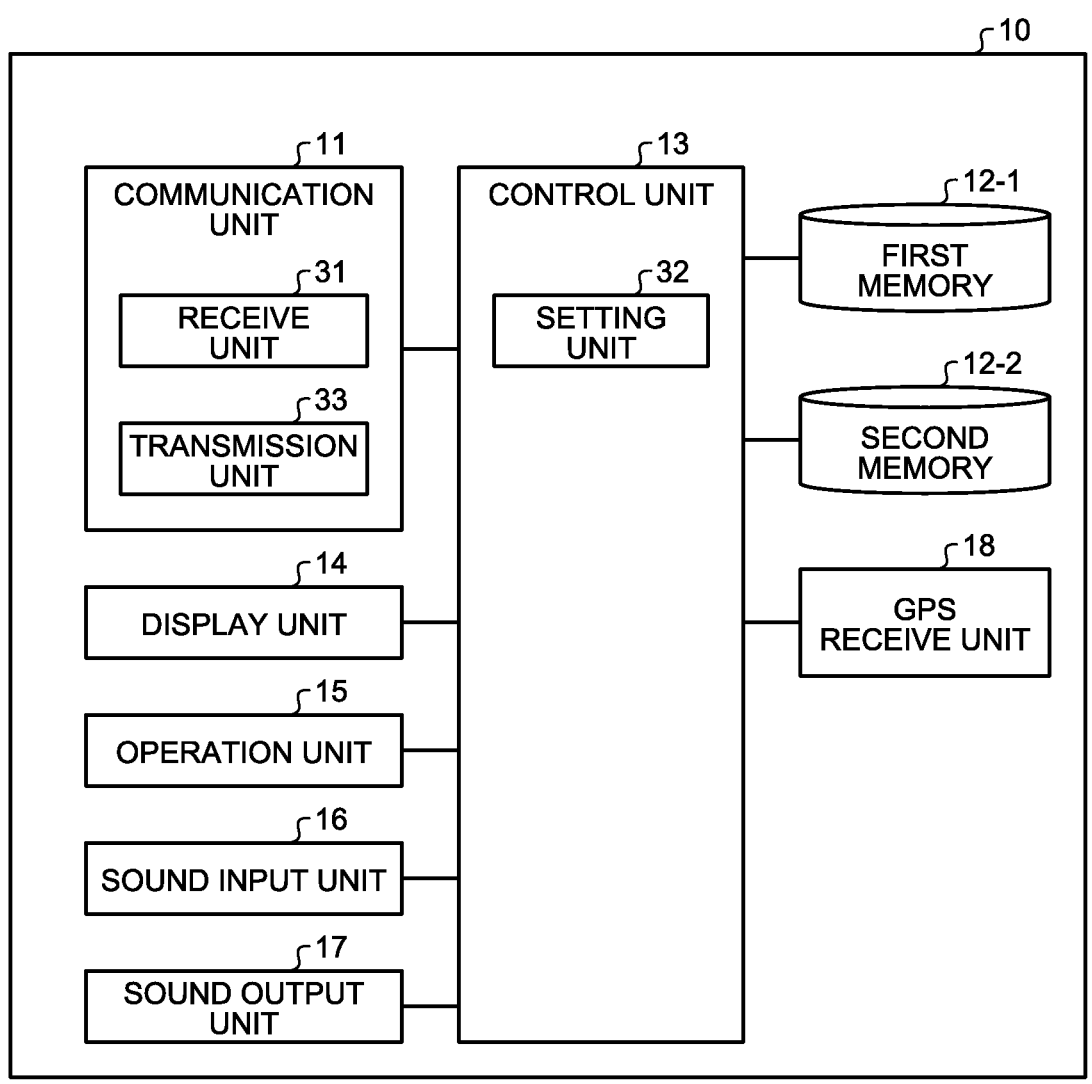
FIG. 10 is a block diagram illustrating a structure of a terminal device according to the first embodiment of the present invention.

With reference to FIG. 10, the structure of the terminal device 10 according to the first embodiment is described. FIG. 10 is a block diagram illustrating the structure of the terminal device 10 according to the first embodiment.

The terminal device 10 includes a communication unit 11, a first memory 12-1, a second memory 12-2, a control unit 13, a display unit 14, an operation unit 15, a sound input unit 16, a sound output unit 17, and a GPS receive unit 18. The control unit 13 is also referred to as a controller.

The communication unit 11 communicates with external devices, such as the base station 200 and another terminal device 10, through a wireless network. The communication unit 11 includes a receive unit 31 and a transmission unit 33. The receive unit 31 is also referred to as a receiver. The transmission unit 33 is also referred to as a transmitter. The communication unit 11 communicates with the base station 200 in accordance with the control of the control unit 13.

The first memory 12-1 stores therein various pieces of data. The first memory 12-1 stores therein various pieces of data that are necessary for the control unit 13 to control the terminal device 10. That is to say, the first memory 12-1 stores therein data relating to each function in accordance with the memory setting information received from the management device 100. The first memory 12-1 is formed by a semiconductor memory such as a RAM or a flash memory. Alternatively, the first memory 12-1 may be formed by a storage medium such as an HDD or an SSD.

The second memory 12-2 stores therein various pieces of data. The second memory 12-2 stores therein computer programs (execution codes), the setting information for the terminal device 10, and the like. The second memory 12-2 is formed by a nonvolatile storage medium such as an HDD or an SSD. The second memory 12-2 stores therein the group ID registered in the terminal device 10. The second memory 12-2 can store one or more arbitrary number of group IDs. If the group IDs are stored, the group IDs may be stored in the order of priority (priority order). That is to say, the information indicating which group ID is used with the priority may be stored. In addition, the user who uses the terminal device 10 may select the group ID to use. The group ID stored in the second memory 12-2 is the information indicating the group to which the terminal device 10 belongs. However, in the case where one terminal device 10 is basically used by only one user like a smartphone, the terminal device 10 and the user are equal; therefore, the group ID is regarded as the group to which the user who uses the terminal device 10 belongs. Even in the case where the terminal device 10 is used by a plurality of users, if the terminal device 10 is configured such that user authentication is performed for each use and a usable group ID is switched for each user, the group ID is regarded as the group to which the user who uses the terminal device 10 belongs.

The control unit 13 controls each part of the terminal device 10. The control unit 13 is formed by, for example, a CPU, a RAM, a ROM, and the like. In this case, the ROM may store therein computer programs for the CPU to control each part. The CPU reads out the computer program stored in the ROM, secures the data region in the RAM, and executes the computer program, thereby controlling each part of the terminal device 10. The computer programs for controlling the terminal device 10 may be stored in the first memory 12-1 or the second memory 12-2. The control unit 13 (controller) includes a setting unit 32.

The GPS receive unit 18 receives a global positioning system (GPS) radio wave and acquires (detects) the position of the terminal device 10. The control unit 13 activates the GPS receive unit 18 when "GPS function" in the memory setting information is used, and deactivates the GPS receive unit 18 when "GPS function" is not used.

The receive unit 31 receives various pieces of information. For example, the receive unit 31 receives from the base station 200, the memory setting information including the information on the memory region that should be set in the memory (first memory 12-1), that is, the memory region that the terminal device 10 should use in accordance with the area kind information corresponding to the current position of the terminal device 10.

The setting unit 32 sets various pieces of information for the terminal device 10. When the receive unit 31 has received the memory setting information, the setting unit 32 stores the memory setting information in the second memory 12-2. That is to say, the setting unit 32 stores the use flag, the start address of the memory region, and the information on the size in the second memory 12-2 for each function to be used by the terminal device 10. Specifically, the setting unit 32 enables the use of the function whose use flag is set to "Yes", and disables the use of the function whose use flag is set to "No". Specifically, when executing the computer program stored in the terminal device 10, the setting unit 32 (that is, control unit 13) may execute the computer program while determining the function that can be used or cannot be used with reference to the use flag in the memory setting information stored in the second memory 12-2. For example, the setting unit 32 changes the menu to be displayed in the display unit 14 so that the user cannot select the function whose use flag is set to "No". The setting unit 32 rearranges the memory regions in the first memory 12-1 based on the memory setting information received by the receive unit 31. When rearranging the memory regions in the first memory 12-1, the setting unit 32 deletes the data stored in the first memory 12-1.

In the case where the group to which the terminal device 10 belongs has changed and the corresponding group kind has changed accordingly, the setting unit 32 deletes the data stored in the first memory 12-1. Specifically, in the case where the group kind has changed temporarily from "civilian" to "police", the setting unit 32 deletes the data stored in the first memory 12-1. Then, when the group kind has returned from "police" to "civilian", the setting unit 32 also deletes the data stored in the first memory 12-1.

The transmission unit 33 transmits various pieces of information. To perform the wireless communication, the transmission unit 33 transmits the registration request including the terminal ID for identifying the terminal device 10 and the group ID to the base station 200. Before the terminal device 10 starts to communicate with another terminal device, the transmission unit 33 transmits the registration request to the base station 200. Thus, before the terminal device 10 starts to communicate with another terminal device, the memory information request message including the base station ID is transmitted from the base station 200 to the management device 100.

The display unit 14 displays various pieces of information. The display unit 14 displays, for example, the menu about each function of the terminal device 10. The display unit 14 is formed by, for example, a display such as a liquid crystal display (LCD) or an organic electro-luminescence (EL) display.

The operation unit 15 receives various operations from the user directed to the terminal device 10. The operation unit 15 receives the operation for transmitting a sound signal to another terminal device 10, for example. The operation unit 15 is formed by, for example, a physical switch. The operation unit 15 may be formed by a touch panel provided to the display unit 14. That is to say, the display unit 14 and the operation unit 15 may be formed integrally.

The sound input unit 16 receives various sounds including the user's voice, and outputs an electric signal corresponding to the sound as a sound signal. The sound input unit 16 is formed by, for example, a general microphone.

The sound output unit 17 outputs various sounds. The sound output unit 17 outputs, as a sound, the sound signal transmitted from another terminal device 10, for example. The sound output unit 17 is formed by a general speaker.

Rearranging Process

Figure 11:
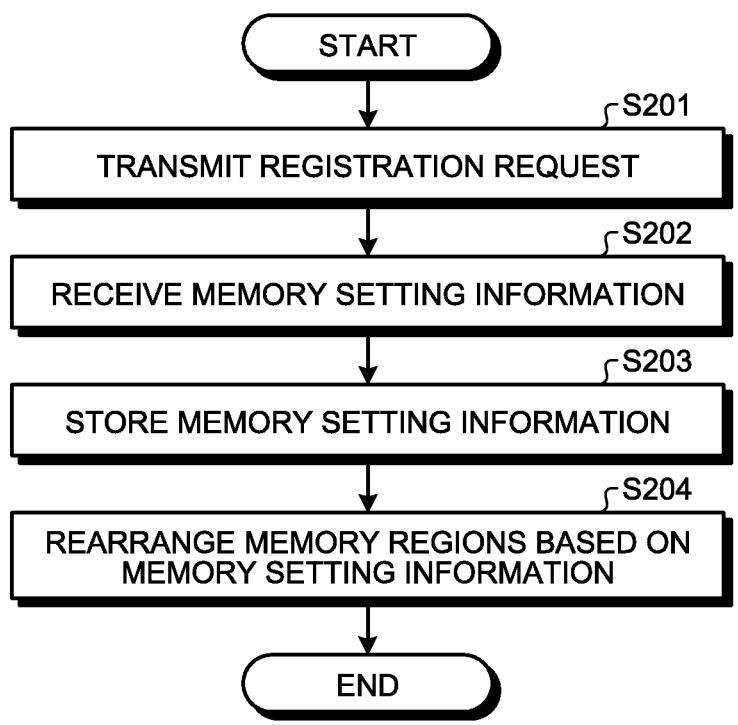
FIG. 11 is a flowchart illustrating one example of the procedure of the process in which the control unit of the terminal device rearranges the memory regions.

With reference to FIG. 11, a process in which the terminal device 10 rearranges the memory regions is described. FIG. 11 is a flowchart illustrating one example of the procedure of the process in which the control unit 13 of the terminal device 10 rearranges the memory regions.

The control unit 13 transmits the registration request to the base station 200 through the communication unit 11 in order to rearrange the memory regions in the first memory 12-1 (step S201). Then, the process advances to step S202.

The control unit 13 receives the memory setting information used to rearrange the memory regions in the first memory 12-1 from the base station 200 through the communication unit 11 (step S202). Then, the process advances to step S203.

The control unit 13 stores the memory setting information received at step S202 in the second memory 12-2 (step S203). Then, the process advances to step S204.

The control unit 13 rearranges the memory regions in the first memory 12-1 based on the memory setting information stored in the second memory 12-2 and deletes (initializes) the data in each memory region (step S204). Thus, the process in FIG. 11 ends.

Data Storing Process

Figure 12:
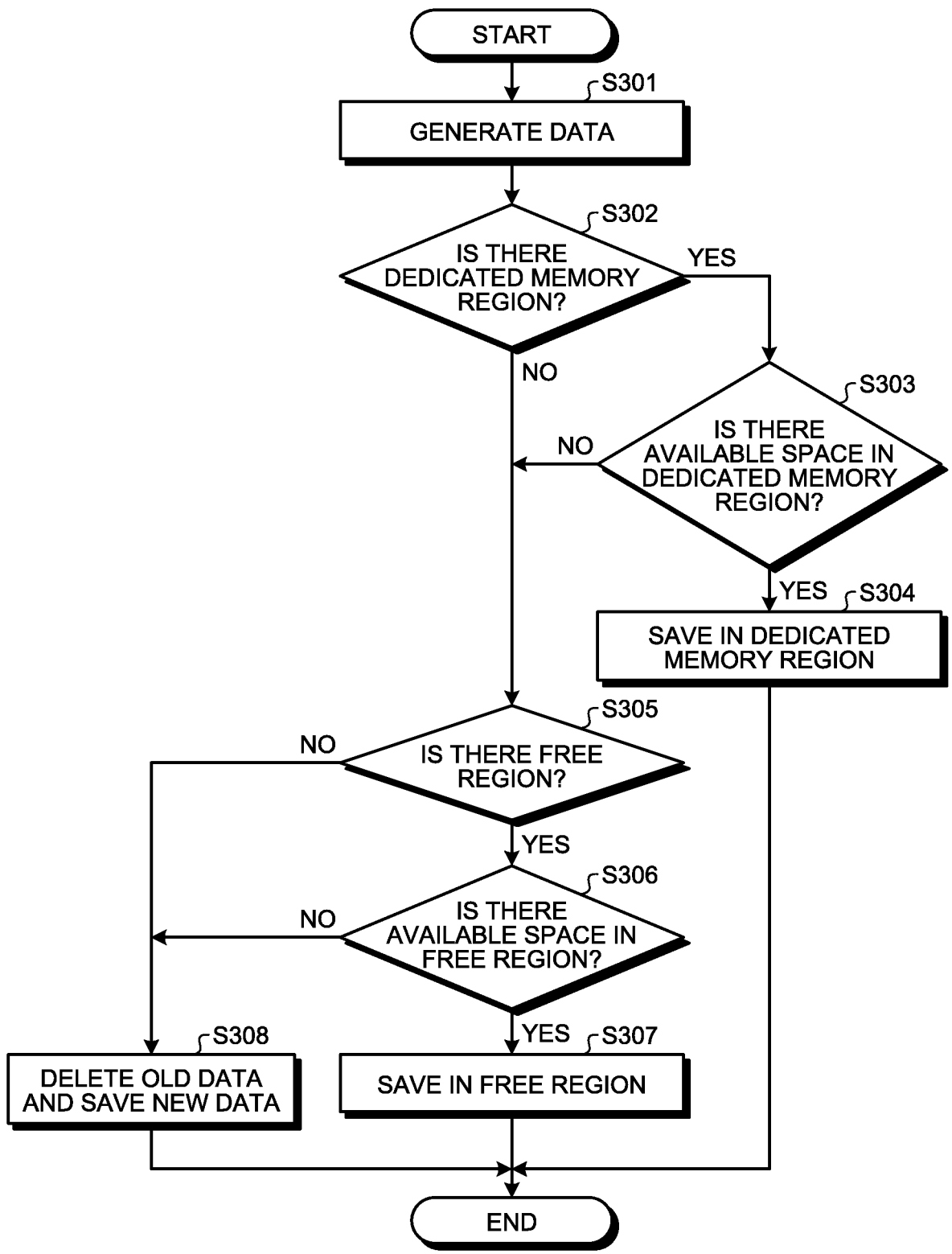
FIG. 12 is a flowchart illustrating one example of the procedure of a process in which the control unit of the terminal device stores data relating to each function in a first memory.

With reference to FIG. 12, the process of storing the data generated by the terminal device 10 is described. As the computer program stored in the terminal device 10 is executed, the data to be stored is generated. For example, as the image function (photographing function) is executed, the image data (photograph data) to be stored is generated. FIG. 12 is a flowchart illustrating one example of the procedure of the process in which the control unit 13 of the terminal device 10 stores the data relating to each function in the first memory 12-1.

The control unit 13 generates the data to be saved relating to each function (step S301). Then, the process advances to step S302.

The control unit 13 determines whether there is a dedicated memory region for the generated data (step S302). For example, in the case where the generated data is data relating to the image function, for example the photograph data obtained by the camera of the terminal device 10, the control unit 13 determines whether there is a dedicated memory region for the image function with reference to the memory setting information stored in the second memory 12-2.

Specifically, when the use flag is set to "Yes", the start address is other than "0", and the size is other than "0" in the memory setting information, the control unit 13 makes a positive determination. In the other cases, the control unit 13 makes a negative determination. If it is determined that there is the dedicated memory region (Yes at step S302), the control unit 13 advances the process to step S303. In contrast, if it is determined that there is no dedicated memory region (No at step S302), the control unit 13 advances the process to step S305.

At step S303, the control unit 13 determines whether there is an available space in the dedicated memory regions (S303). If it is determined that there is the available space in the dedicated memory region (Yes at step S303), the control unit 13 advances the process to step S304 and saves the data in the dedicated memory region (step S304). Then, the control unit 13 ends the process in FIG. 12. In contrast, if it is determined that there is no available space (No at step S303), the control unit 13 advances the process to step S305.

At step S305, the control unit 13 determines whether there is a free region in the first memory 12-1 (step S305). Specifically, when the function is "free region", the start address is other than "0", and the size is other than "0" in the memory setting information, the control unit 13 makes a positive determination. In the other cases, the control unit 13 makes a negative determination. If it is determined that there is the free region (Yes at step S305), the control unit 13 advances the process to step S306. On the other hand, if it is determined that there is no free region (No at step S305), the control unit 13 advances the process to step S308.

At step S306, the control unit 13 determines whether there is an available space in the free region (step S306). If it is determined that there is an available space in the free region (Yes at step S306), the process advances to step S307 and the control unit 13 saves the data in the free region (step S307). Then, the control unit 13 ends the process in FIG. 12. In contrast, if it is determined that there is no available space in the free region (No at step S306), the control unit 13 advances the process to step S308.

At step S308, the control unit 13 deletes the old data from the dedicated memory region or the free region and saves the new data (step S308). At step S308, the control unit 13 deletes the data in the order from the oldest one among the pieces of data stored in the dedicated memory region or the free region, and saves the new data. Alternatively, the information to let the user select the data to delete may be displayed in the display unit 14, the instruction from the user may be received in the operation unit 15, and the data may be deleted in accordance with the instruction. Thus, the process in FIG. 12 ends.

As described above, in the present embodiment, the management device 100 transmits the memory setting information on the memory region to be set by each terminal device 10 based on the area kind and the group kind. Also when the management device 100 has received the memory information request message from the terminal devices 10 through the base station 200, the management device 100 transmits to each terminal device 10 the memory setting information on the memory region based on the area kind and the group kind of each terminal device 10. Each terminal device 10 rearranges the memory regions in the memory automatically in accordance with the memory setting information. As a result, in the present embodiment, the memory regions in the plural terminal devices 10 can be automatically rearranged efficiently.

In the present embodiment, the data can be deleted automatically in the case where the group kind has changed from "civilian" to "police" or from "police" to "civilian". As a result, according to the present embodiment, the leak of important information such as confidential information can be prevented.

In the present embodiment, the memory region includes the dedicated memory region for each function and the free region whose purpose is not limited. The dedicated memory region requires fewer processes when executing the computer program than the free memory region; thus, the process is performed faster in the dedicated memory region than in the free memory region. On the other hand, if the volume of the dedicated memory region has become insufficient, the free region whose purpose is not limited can be used as an extension memory in which the data relating to any function can be saved. That is to say, by combining the dedicated memory region and the free region, the memory can be used efficiently. The management device 100 can manage the memory and the function information of the terminal device 10, and can easily change or update the function used by the terminal device 10 or the ratio of the memory regions in the memory as required. As a result, the user does not need to operate to change the setting of the memory region in the terminal device 10; thus, the convenience is improved.

Modification of First Embodiment

In the first embodiment, the base station ID is used as the information that specifies the area where the terminal device 10 is positioned; however, in the present modification, the positional information of the terminal device 10 is used. For example, the GPS receive unit 18 of the terminal device 10 may acquire the position of the terminal device 10 (latitude and altitude) and the acquired position may be used as the positional information. The position of the terminal device 10 may be acquired by not just the GPS but also the information on the access point of wireless LAN or the information on the radio wave received from the base station 200.

Figures 13, 14:
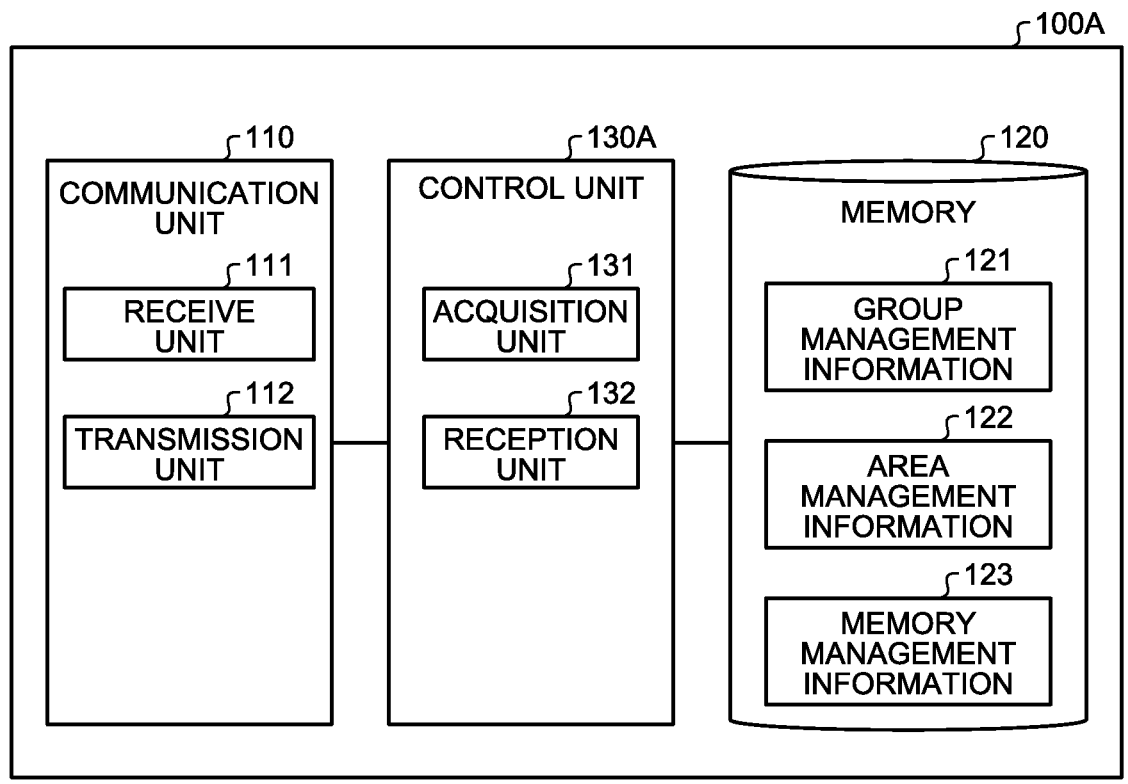
FIG. 13 is a diagram for describing a data structure of area management information in a modification of the first embodiment of the present invention.
FIG. 14 is a block diagram illustrating one example of a structure of a management device according to a second embodiment of the present invention.

FIG. 13 is a diagram for describing a data structure of area management information 122A in the present modification. The area management information 122A is data in which the range of the area and the area kind are associated with each other. As illustrated in this drawing, the range of the latitude and the altitude is included in the range of the area. For example, in the case where each area is rectangular, each area can be indicated by the combination of the upper left vertex (latitude, altitude) of the rectangle and the lower right vertex (latitude, altitude) of the rectangle. In the example illustrated in this drawing, for example, (latitude 1, altitude 1) corresponds to the positional information of the upper left vertex of a first area, and (latitude 2, altitude 2) corresponds to the positional information of the lower right vertex of the first area. In this drawing, the area kind of the first area is "urban".

In the present modification, a message different from the message in the first embodiment illustrated in FIG. 8 is used. At step S11A corresponding to step S11, the terminal device 10 transmits the terminal ID, the group ID, and the positional information of the terminal device 10 to the base station 200. That is to say, the positional information of the terminal device 10 is added to the message in the first embodiment. Next, at step S12A corresponding to step S12, the base station 200 transmits the memory information request message (request message) to the management device 100. This message includes the group ID and the positional information of the terminal device 10. That is to say, the positional information of the terminal device 10 is used instead of the base station ID used in the first embodiment.

As step S13A corresponding to step S13, the management device 100 acquires the memory setting information based on the memory information request message. First, the management device 100 specifies the area corresponding to the positional information included in the memory information request message with reference to the area management information 122A. Specifically, the area in which the latitude and the altitude included in the memory information request message are included in the range of the area is specified. Next, the area kind corresponding to the specified area is acquired. In addition, the group ID included in the memory information request message is subjected to the process similar to that in the first embodiment; thus, the group kind is acquired. Then, based on at least one of the area kind and the group kind, the process similar to that in the first embodiment is performed; thus, the memory setting information is acquired. The process after step S14 is the same as that in the first embodiment. That is to say, the management device 100 acquires the memory setting information to be used by one terminal device (terminal device 10 that transmits the registration request) in accordance with the information that specifies the area where the one terminal device is positioned (positional information of the terminal device 10), and transmits the acquired information to the one terminal device.

In the present modification, the positional information (latitude, altitude) of the terminal device 10 is used as the information that specifies the area where the terminal device 10 is positioned; therefore, the area kind can be set in more detail. A plurality of area kinds can be associated with one communication area; for example, in the communication area of one base station 200, a part of the area may be "urban" and another part may be "rural". Alternatively, three or more area kinds can be associated with one communication area. Therefore, the memory region in the memory of the terminal device 10 can be set in detail in accordance with the position of the terminal device 10.

Second Embodiment

With reference to FIG. 14, a management device 100A according to a second embodiment of the present invention is described. FIG. 14 is a block diagram illustrating one example of a structure of the management device 100A according to the second embodiment of the present invention.

The management device 100A is different from the management device 100 illustrated in FIG. 2 in that a control unit 130A includes a reception unit 132.

The reception unit 132 receives, from the base station 200 or another device, various pieces of information on the corresponding communication area. The reception unit 132 receives event information on the event to be held in each communication area from the base station 200, for example. The control unit 130A stores the event information received in the reception unit 132 in the memory 120. This event information may be the information on the event that is currently held or the information on the event that is held in a particular time of the year. The event information is the information based on which the degree of congestion (congestion degree) of people or cars in the communication area can be predicted. For example, in the case where the communication area includes a temple or a shrine, even if the area is "rural" area where the number of people is usually small, many people come to visit the temple or shrine on New Year holidays and therefore, it is assumed that this area is temporarily regarded as "urban" area. In this case, the reception unit 132 receives the event information indicating that "the event where congestion is expected is held from 10:00 on December 31 to 17:00 on January 7". This kind of event information may be the information on a particular time of the year, such as Halloween or Christmas, in addition to the visit to the shrine on the New Year holidays. The event may be not just the event that is common throughout the country but also the event that is held in a particular communication area. For example, in a case where a concert or flea market is held on a particular date (time of year) in a particular communication area, many people gather in "rural area" where the number of people is usually small; thus, this area is predicted to be "urban" area temporarily.

The acquisition unit 131 changes the memory management table to acquire based on the event information received by the reception unit 132. For example, if the acquisition unit 131 acquires the data in which the area kind of the area management information 122 is "rural", the acquisition unit 131 changes the area kind to "urban" in the time of the year where it is predicted that the number of people in the communication area is large (congestion degree is high). Then, the acquisition unit 131 acquires the memory management table corresponding to the area kind "urban". This is because the function necessary for the terminal device 10 is different depending on the congestion degree in the communication area. For example, in an area where the number of people is usually small and crimes rarely occur, people may gather in a particular time of the year and the number of crimes may increase. In such a case, it is preferable that the group that usually belongs to "police" in "rural" is categorized to "police" in "urban" temporarily, and in accordance with this category, the function and the memory region that can be used in the terminal device 10 are determined.

Process in Second Embodiment

Figure 15:
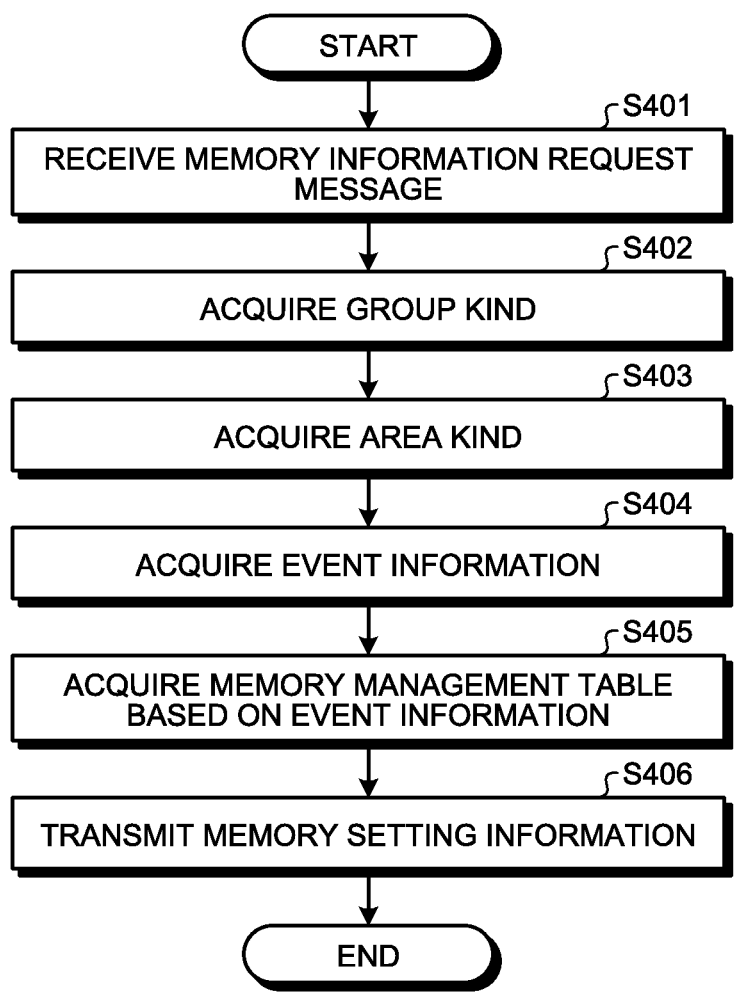
FIG. 15 is a flowchart illustrating one example of the procedure of a process in which a control unit of the management device according to the second embodiment of the present invention transmits the memory setting information.

With reference to FIG. 15, the process performed by the control unit 130A of the management device 100A is described. FIG. 15 is a flowchart illustrating one example of the procedure of the process in which the control unit 130A of the management device 100A transmits the memory setting information.

Step S401 to step S403 are the same as step S101 to step S103 in FIG. 9; thus, the description is not made.

The control unit 130A acquires the event information (step S404). Then, the process advances to step S405.

The control unit 130A acquires the memory management table as the memory setting information from the memory 120 based on the event information (step S405). Then, the process advances to step S406.

The control unit 130A transmits the memory setting information to the base station 200 (step S406). Then, the control unit 130A ends the process in FIG. 15. The event information may be stored in the memory 120 in advance. In this case, the reception unit 134 can be omitted. The event information is not limited to the event that makes people or cars gather more than usual. For example, in a business distinct, the number of people is usually large; however, in the Year-End and New Year holidays or in long holidays, the congestion degree decreases. This kind of information may be included in the event information and the area that usually belongs to "urban" may be categorized into the area kind "rural" or "residential" temporarily.

As described above, in the present embodiment, the management device 100A transmits the memory setting information on the memory to be set by each terminal device 10 in consideration of the event information for each communication area. Thus, each terminal device 10 rearranges the memory regions in the memory in accordance with the event information. As a result, in the present embodiment, the memory in the terminal devices 10 can be rearranged more suitably and efficiently.

Third Embodiment

Figure 16:
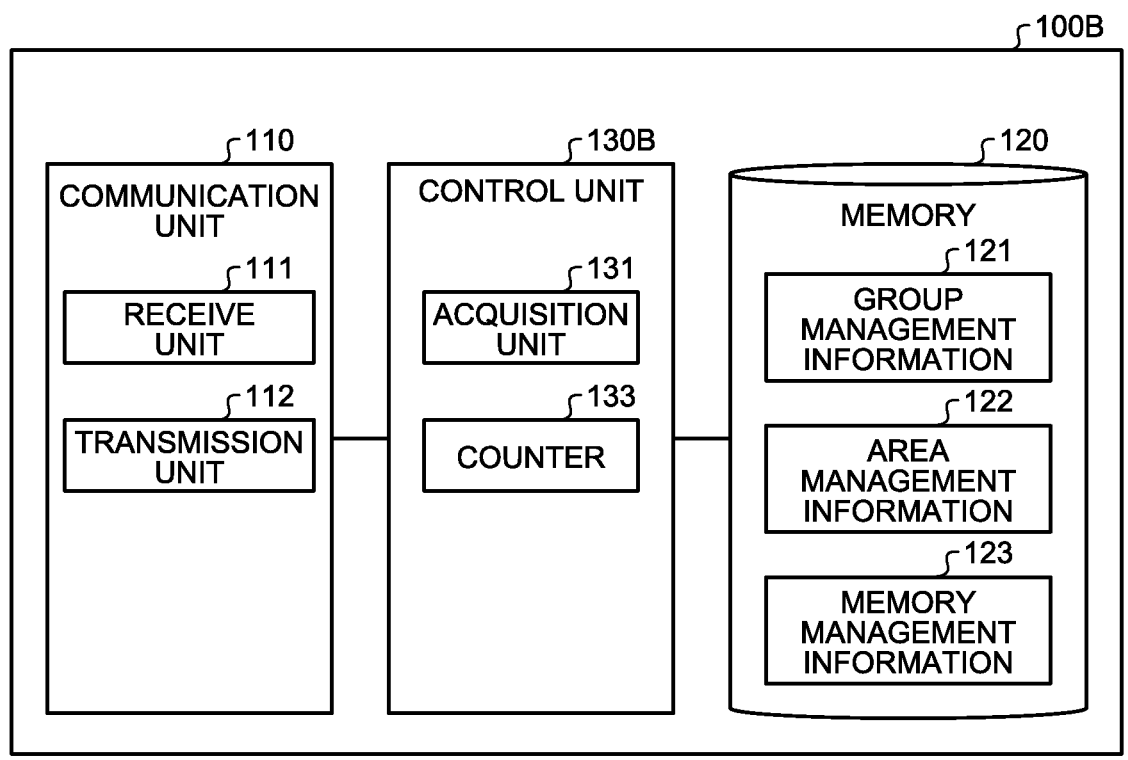
FIG. 16 is a block diagram illustrating one example of a structure of a management device according to a third embodiment of the present invention.

With reference to FIG. 16, a management device 100B according to a third embodiment of the present invention is described. FIG. 16 is a block diagram illustrating one example of a structure of the management device 100B according to the third embodiment of the present invention.

The management device 100B is different from the management device 100 illustrated in FIG. 2 in that a control unit 130B includes a counter 133. The counter 133 is also referred to as a calculation unit.

The counter 133 counts the number of terminal devices 10 (users) that satisfy a predetermined condition in each communication area. For example, the counter 133 counts the number of terminal devices 10 having been registered in each base station 200. Alternatively, the counter 133 counts the number of terminal devices 10 that are capable of group communication within the communication area. Further alternatively, the counter 133 may count the number of terminal devices 10 for each group ID. In this case, the counter 133 may count the number of terminal devices 10 existing in each communication area for each group ID and calculate the total value (total value in all the communication areas) for each group ID.

The acquisition unit 131 acquires the update information of the memory setting information to be set to the terminal device 10 in accordance with the number of terminal devices 10 counted by the counter 133. The acquisition unit 131 acquires the update information of the memory management table from the memory management information 123 in accordance with the number of terminal devices 10 that can join in the group communication, for example.

Figures 17, 18:
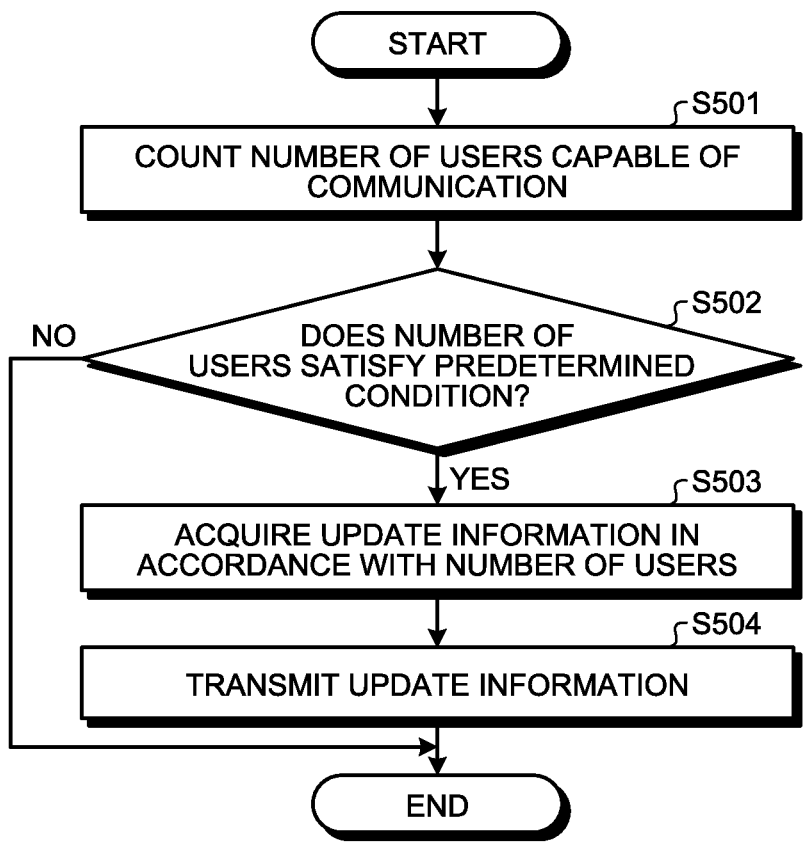
FIG. 17 is a diagram for describing one example of update information.
FIG. 18 is a flowchart illustrating one example of the procedure of a process in which a control unit of the management device according to the third embodiment of the present invention transmits the update information.

The update information is described with reference to FIG. 17. FIG. 17 is a diagram for describing a data structure of the update information.

As illustrated in FIG. 17, the number of users (the number of terminal devices 10) who can join in the group communication and the update information ID are associated with each other in an update table 400. If the number of users who can join in the group communication in a certain group is "x1", for example, the acquisition unit 131 acquires the update information in which the update information ID is "update information #1".

"Update information #1" includes information on the function that cannot be performed when the number of users who can join in the group communication of a certain group is less than "x1". For example, in the case where it is assumed to execute "game function" between the terminal devices 10 that belong to the same group, "update information #1" includes the information on "game function" that cannot be played when the number of users is less than "x1". For example, assuming that x1 is four, the information on "mah-jongg game" that can be played only when there are four players is recorded in "update information #1". In this case, when the number of people who can join in the group communication in a certain group has become "x1", "update information #1" is transmitted to the terminal devices 10 that can join in the group communication. The terminal device 10 changes the use flag of "game function" to "Yes" or sets the storage volume of "game function" to be large in accordance with "update information #1" so that the terminal device 10 can execute the game. Thus, each user can play the game in accordance with "update information #1". Similarly, when the number of users who can join in the group communication in a certain group has become "x2", "update information #2" is transmitted to the terminal devices 10 that can join in the group communication. The condition for the number of users is not limited to the condition "x1 or more" as illustrated in FIG. 17 and may be the condition "x1 or more and less than x2" or "less than x1". In addition, the update information is not limited to "game function" and may be another function. Moreover, in the above description, it is assumed that the terminal devices 10 that belong to the same group execute the same game; however, the present invention is not limited to this example. In another example, it may be assumed that an arbitrary number of terminal devices 10 can execute the same game regardless of whether the terminal devices 10 belong to the group. That is to say, the update information may be transmitted to the terminal devices 10 regardless of the group communication. Some games can be played between the users in the same communication area and other games can be played between the users in different communication areas. In the latter case, the number of users who can communicate over a plurality of communication areas may be counted. That is to say, the number of users who can communicate in only one communication area may be counted or the total number in all the communication areas may be counted.

Process in Third Embodiment

With reference to FIG. 18, the process performed by the control unit 130B of the management device 100B is described. FIG. 18 is a flowchart illustrating one example of the procedure of the process in which the control unit 130B of the management device 100B transmits the update information.

The control unit 130B counts the number of users (the number of terminal devices 10) who can communicate in a particular communication area or all the communication areas (step S501). Then, the process advances to step S502.

The control unit 130B determines whether the number of users (the number of terminal devices 10) who can communicate satisfies a predetermined condition (step S502). The predetermined condition for the number of users (the number of terminal devices 10) may be, for example, various conditions such as "more than or equal to a predetermined number", "less than a predetermined number", or "more than or equal to a first predetermined number and less than a second predetermined number". If it is determined that the number of users does not satisfy the predetermined condition for the number of users (No at step S502), the control unit 130B ends the process in FIG. 18. In contrast, if it is determined that the number of users satisfies the predetermined condition (Yes at step S502), the control unit 130B advances the process to step S503 and acquires the update information in accordance with the number of users (step S503). Then, the process advances to step S504.

The control unit 130B transmits the update information acquired at step S503 to the base station 200 (step S504). Then, the control unit 130B ends the process in FIG. 18.

As described above, in the present embodiment, the management device 100B can count the number of terminal devices 10 registered in the base station 200, that is, the number of users who can communicate, and transmit the update information in accordance with the number of users. As a result, the management device 100B can cause the terminal device 10 to execute a particular function in accordance with the number of users who can communicate. Therefore, the unnecessary memory region for the function that cannot be executed when the number of users does not satisfy the predetermined condition or for the function that means nothing even if executed will not be secured, and the limited memory resource of the terminal device 10 can be effectively used for another function.

Fourth Embodiment

Figure 19:
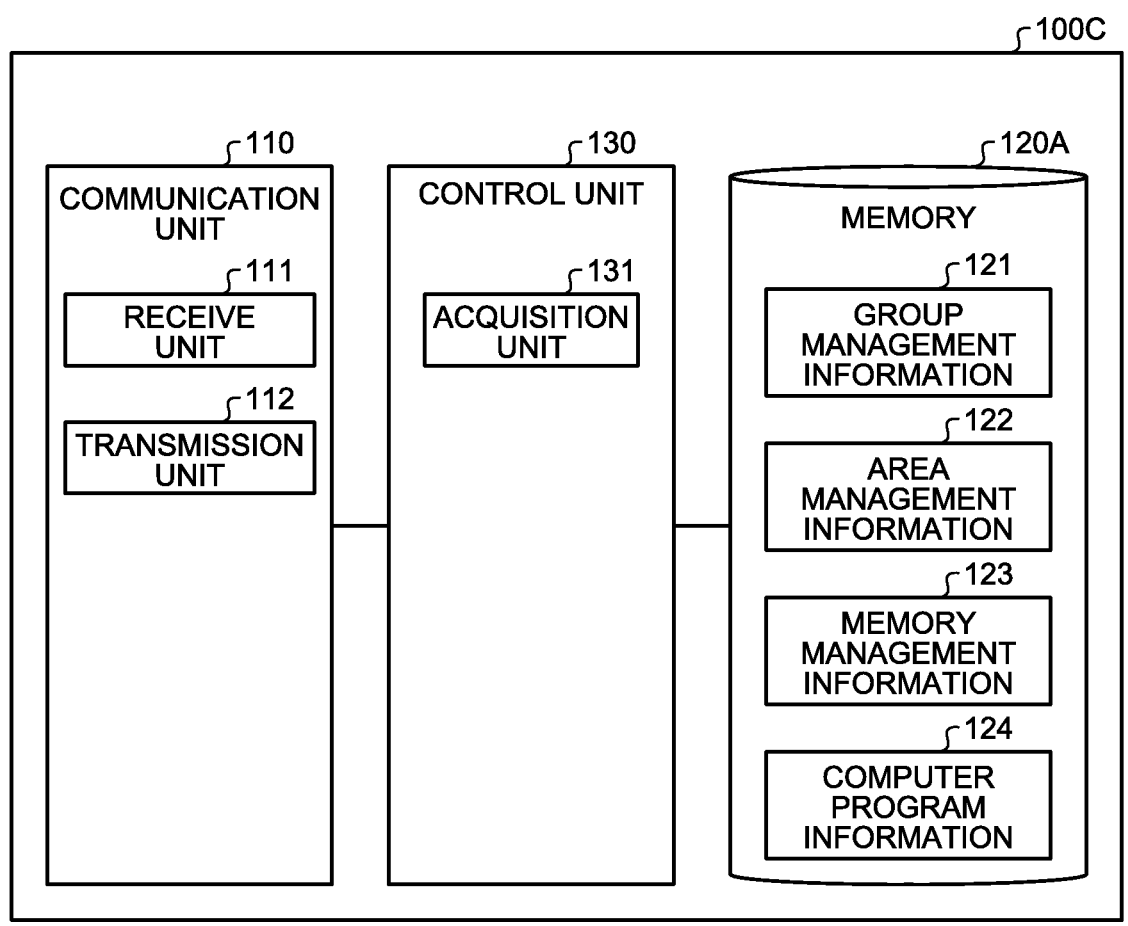
FIG. 19 is a block diagram illustrating one example of a structure of a management device according to a fourth embodiment of the present invention.

With reference to FIG. 19, a management device 100C according to a fourth embodiment of the present invention is described. FIG. 19 is a block diagram illustrating one example of a structure of the management device 100C according to the fourth embodiment of the present invention.

The management device 100C is different from the management device 100 illustrated in FIG. 2 in that a memory 120A stores computer program information 124.

The computer program information 124 is a computer program for causing the terminal device 10 to execute a particular function. For example, the computer program information 124 is a computer program for causing the terminal device 10 to execute "emergency transmission function", "status function", "SMS function", "image function", "game function", and "GPS function" as illustrated in FIG. 7A. The computer program information 124 includes a computer program module such as a dynamic link library for causing the terminal device 10 to execute a particular function.

The computer program information 124 may include the information on the computer program module or the computer program stored in each terminal device 10. For example, the computer program information 124 may include the information indicating that the first terminal device 10-1 stores computer programs for executing "SMS function", "image function", "game function", and "GPS function" but does not store computer programs for executing "emergency transmission function" and "status function". Thus, the acquisition unit 131 can acquire the computer program necessary for the terminal device 10 based on the computer program information 124 and the memory setting information to be transmitted to the terminal device 10. That is to say, after the functions necessary for the terminal device 10 are determined based on at least one of the area kind information and the group kind information, only the computer program of the function among the necessary functions that is not stored in the terminal device 10 is acquired, and the acquired computer program is transmitted to the terminal device 10 through the transmission unit 112. Thus, the transmission of useless data can be prevented and the computer program can be transmitted efficiently.

The acquisition unit 131 acquires the information on a predetermined computer program from the memory 120A. The acquisition unit 131 acquires, from the memory 120A, the computer program requested from the terminal device 10. For example, if the computer program of "image function" is requested from the terminal device 10, the acquisition unit 131 acquires the computer program of "image function" from the computer program information 124 of the memory 120A.

The transmission unit 112 transmits the computer program acquired by the acquisition unit 131 to the base station 200 through the communication unit 110. The base station 200 transmits the computer program received from the management device 100C to the terminal device 10.

In the present embodiment, the terminal device 10 deletes unnecessary computer programs. Specifically, the setting unit 32 of the control unit 13 in the terminal device 10 deletes the computer program of the function whose use flat is set to "No" (however, the free region is excluded because the free region is not the function) from the second memory 12-2 when receiving the memory setting information. For example, in the case where the terminal device 10 has received the memory management table 300B illustrated in FIG. 7B, the setting unit 32 deletes the computer programs for executing "SMS function" and "game function" from the second memory 12-2. After the computer program for the function whose use flag is set to "No" is deleted, the information on the deletion may be transmitted from the terminal device 10 to the management device 100C. Thus, the management device 100C can acquire the correct information on the computer program stored in the terminal device 10; therefore, the efficient data transmission is possible.

In addition, when receiving the computer program from the management device 100C through the base station 200, the setting unit 32 stores the computer program in the second memory 12-2. Specifically, the terminal device 10 receives the memory setting information and the computer program of the function that is necessary but is not stored in the second memory 12-2.

Process Performed by Management Device According to Fourth Embodiment

Figure 20:
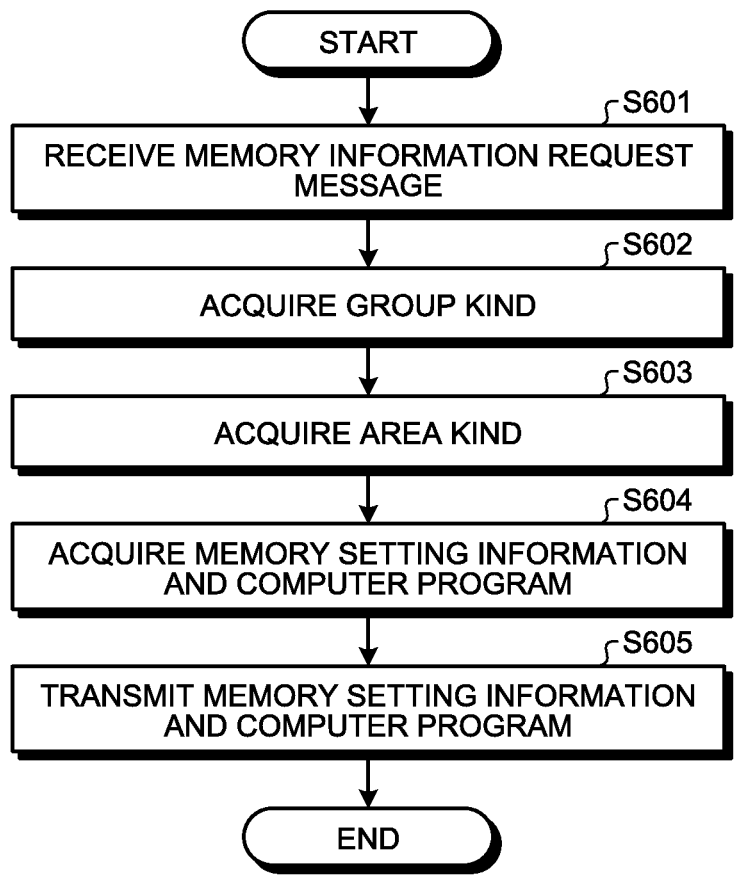
FIG. 20 is a flowchart illustrating one example of the procedure of a process in which a control unit of the management device according to the fourth embodiment of the present invention transmits the memory setting information and a computer program.

With reference to FIG. 20, the process performed by the control unit 130 of the management device 100C is described. FIG. 20 is a flowchart illustrating one example of the procedure of the process in which the control unit 130C of the management device 100 transmits the memory setting information and the computer program.

Step S601 to step S603 are the same as step S101 to step S103 in FIG. 9; thus, the description is not made.

The control unit 130 acquires the necessary computer program and the memory management table corresponding to the group kind acquired at step S602 and the area kind acquired at step S603 with reference to the memory management information 123 and the computer program information 124 (step S604). As described above, the memory management table acquired here is also referred to as the memory setting information. The necessary computer program is the computer program that corresponds to the function whose use flag is set to "Yes" in the memory management table and that is not stored in the terminal device 10. In the case where the information on the computer program stored in the terminal device 10 cannot be obtained, all the computer programs corresponding to the functions whose use flag is set to "Yes" may be acquired. At step S604, the control unit 130 does not acquire the computer program if there is no necessary computer program. Then, the process advances to step S605.

The control unit 130 transmits the memory setting information and the computer program acquired at step S604 to the base station 200 through the communication unit 110 (step S605). Then, the process in FIG. 20 ends.

Process Performed by Terminal Device According to Fourth Embodiment

Figure 21:
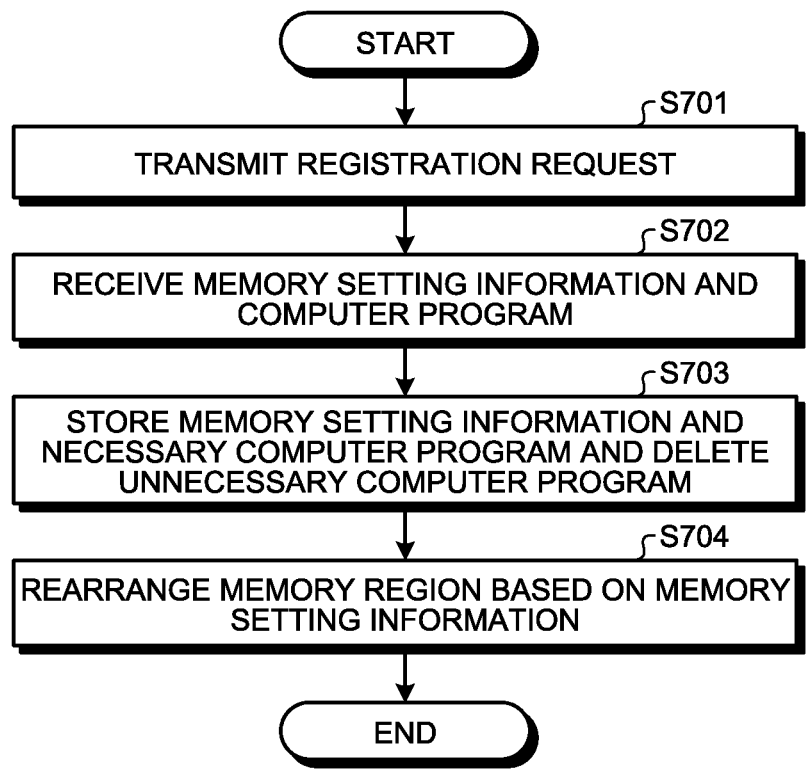
FIG. 21 is a flowchart illustrating one example of the procedure of a process in which the control unit of the terminal device rearranges the memory regions.

With reference to FIG. 21, the process performed by the control unit 13 of the terminal device 10 is described. FIG. 21 is a flowchart illustrating one example of the procedure of the process in which the control unit 13 of the terminal device 10 rearranges the memory regions.

Upon the detection of another base station 200 through the communication unit 11, the control unit 13 transmits the registration request to the base station 200 through the communication unit 11 in order to perform the communication with the base station 200 (step S701). Then, the process advances to step S702.

The control unit 13 receives the necessary computer program and the memory setting information used for rearranging the memory region in the first memory 12-1 from the base station 200 through the communication unit 11 (step S702). At step S702, the control unit 13 does not receive the computer program if there is no necessary computer program. Then, the process advances to step S703.

The control unit 13 stores the necessary computer program and the memory management table received at step S702 in the second memory 12-2, and deletes the unnecessary computer program from the second memory 12-2 (step S703). At step S703, the control unit 13 does not delete the computer program if there is no unnecessary computer program. Then, the process advances to step S704.

The control unit 13 rearranges the memory region in the first memory 12-1 based on the memory management table and deletes the data (step S704). Then, the process in FIG. 21 ends.

As described above, in the present embodiment, the management device 100C stores the computer program to be executed by the terminal device 10 and can transmit the computer program to the terminal device 10 in accordance with the necessity of the terminal device 10. In this case, since the terminal device 10 does not need to store the unnecessary computer program, the unnecessary computer program can be deleted. As a result, the terminal device 10 can use the memory efficiently.

According to the embodiments, memory regions of a plurality of terminal devices can be set efficiently.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A management device for managing a plurality of terminal devices, the management device comprising:
 a memory configured to store therein
  area kind information that indicates a characteristic of an area where a base station is positioned and that is associated with an identifier of the base station,
  memory setting information that defines functions to be used by a terminal device and a size of a memory region to be assigned to each of the functions, the memory setting information being determined in accordance with the area kind information,
  group kind information that indicates a characteristic of a communication group to which the terminal device belongs and that is associated with an identifier of the communication group,
  the group kind information that indicates at least whether a communication group to which the terminal device belongs is a police group or a civilian group, and
  in the memory setting information, a first number of bytes of the memory region to be used by the terminal device belonging to the police group for an emergency transmission function is set larger than a second number of bytes of the memory region to be used by the terminal device belonging to the civilian group for the emergency transmission function;
 a receiver configured to receive, from the base station, a memory information request message including the identifier of the base station to be used by a terminal device of the plurality of terminal devices;
 a controller configured to specify, by referring to the memory, a subset of the area kind information corresponding to the identifier of the base station included in the memory information request message and acquire a subset of the memory setting information corresponding to the subset of the area kind information from the memory; and
 a transmitter configured to transmit the subset of the memory setting information to the terminal device via the base station,
 the area kind information indicates at least whether the area where the base station is positioned is an urban area or a rural area, and
 the group kind information indicates at least whether the communication group to which the terminal device belongs is a police group or a civilian group.

2. The management device according to claim 1, wherein the memory is configured to further store therein the area kind information, the group kind information, and the memory setting information so as to be associated with each other,
 the memory information request message received by the receiver includes the identifier of the base station to be used by the terminal device and the identifier of the communication group to which the one terminal device belongs,
 the controller is configured to specify, by referring to the memory, the subset of the area kind information corresponding to the identifier of the base station included in the memory information request message, specify a subset of the group kind information corresponding to the identifier of the communication group included in the memory information request message, and acquire the subset of the memory setting information corresponding to the subset of the area kind information and the subset of the group kind information from the memory.

3. The management device according to claim 1, further comprising a counter configured to count a number of terminal devices that are registered in the base station for each of multiple communication groups, wherein
 the memory stores therein update information of the memory setting information so as to be associated with a condition regarding the number of terminal devices,
 the controller is configured to, in response to determining that the number of terminal devices counted by the counter matches the condition stored in the memory, acquire, from the memory, the update information corresponding to the number of terminal devices matched, and
 the transmitter is configured to transmit the acquired update information to the one terminal device.

4. The management device according to claim 1, further comprising a reception unit configured to receive event information indicating a time period in which an event where multiple people gather is held in a communication area of the base station to be used by the terminal device, wherein
 the area kind information indicates at least whether the area where the base station is positioned is an urban area or a rural area, and
 the controller is configured to, in response to determining, during the time period in which the event is held, that the specified area kind information indicates that the area where the base station is positioned is the rural area, acquire, from the memory, a first subset of the memory setting information corresponding to the urban area instead of a second subset of the memory setting information corresponding to the rural area.

5. A terminal device comprising:
a transmitter configured to transmit, to a base station, a registration request to use the base station;
a receiver configured to receive, from the base station as a response to the registration request, memory setting information which is determined in accordance with an area where the base station is positioned, the memory setting information indicating functions to be used by the terminal device and a size of a memory region to be assigned to each of the functions, group kind information that indicates a characteristic of a communication group to which the terminal device belongs and that is associated with an identifier of the communication group, the group kind information that indicates at least whether a communication group to which the terminal device belongs is a police group or a civilian group, and in the memory setting information, a first number of bytes of the memory region to be used by the terminal device belonging to the police group for an emergency transmission function is set larger than a second number of bytes of the memory region to be used by the terminal device belonging to the civilian group for the emergency transmission function; and
a controller configured to set respective memory regions used for the functions in a memory of the terminal device based on the memory setting information,
the area kind information indicates at least whether the area where the base station is positioned is an urban area or a rural area, and
the group kind information indicates at least whether the communication group to which the terminal device belongs is a police group or a civilian group.

6. The terminal device according to claim 5, wherein
the transmitter is configured to transmit, to the base station, the registration request including an identifier of a communication group to which the terminal device belongs, wherein
the receiver is configured to receive, from the base station, the memory setting information determined in accordance with the area where the base station is positioned and the communication group to which the terminal device belongs, and
the controller is configured to delete data stored in the memory in response to determining that a group kind of the communication group to which the terminal device belongs has changed from a police group to a civilian group or has changed from the civilian group to the police group, and rearrange the memory regions for the functions.

7. A non-transitory computer-readable recording medium containing a computer program causing a computer to execute:
storing, in a memory, area kind information that indicates a characteristic of an area where a base station is positioned and that is associated with an identifier of the base station;
storing, in the memory, memory setting information in which functions to be used by a terminal device and a size of a memory region to be assigned to each of the functions are defined, the memory setting information being determined in accordance with the area kind information;
storing, in the memory, group kind information that indicates a characteristic of a communication group to which the terminal device belongs and that is associated with an identifier of the communication group,
storing, in the memory, the group kind information that indicates at least whether a communication group to which the terminal device belongs is a police group or a civilian group, and
in the memory setting information, a first number of bytes of the memory region to be used by the terminal device belonging to the police group for an emergency transmission function is set larger than a second number of bytes of the memory region to be used by the terminal device belonging to the civilian group for the emergency transmission function;
receiving, from the base station, a memory information request message including the identifier of the base station to be used by the terminal device;
specifying, by referring to the memory, a subset of the area kind information corresponding to the identifier of the base station included in the memory information request message;
acquiring a subset of the memory setting information corresponding to the subset of the area kind information from the memory; and
transmitting the subset of the memory setting information to the terminal device via the base station,
the area kind information indicates at least whether the area where the base station is positioned is an urban area or a rural area, and
the group kind information indicates at least whether the communication group to which the terminal device belongs is a police group or a civilian group.

8. The management device according to claim 1, wherein
the memory setting information defines, for each of the functions, a start address of the memory region and a number of bytes indicating the size of the memory region.

9. The terminal device according to claim 5, wherein
the memory setting information defines, for each of the functions, a start address of the memory region and a number of bytes indicating the size of the memory region.

10. The terminal device according to claim 9, wherein
the memory setting information is determined in accordance with the area where the base station is positioned and a communication group to which the terminal device belongs, the communication group including a police group and a civilian group, and
in the memory setting information, a first number of bytes of the memory region to be used by the terminal device belonging to the police group for an emergency transmission function is set larger than a second number of bytes of the memory region to be used by the terminal device belonging to the civilian group for the emergency transmission function.

11. The non-transitory computer-readable recording medium according to claim 7, wherein
the memory setting information defines, for each of the functions, a start address of the memory region and a number of bytes indicating the size of the memory region.

12. The non-transitory computer-readable recording medium according to claim 11, wherein
the computer program causes the computer to execute storing, in the memory, group kind information that indicates at least whether the communication group to which the terminal device belongs is a police group or a civilian group, and in the memory setting information, a first number of bytes of the memory region to be used by the terminal device belonging to the police group for an emergency transmission function is set larger than a second number of bytes of the memory region to be used by the terminal device belonging to the civilian group for the emergency transmission function.

* * * * *